United States Patent
Karimoto

(10) Patent No.: US 8,264,570 B2
(45) Date of Patent: Sep. 11, 2012

(54) LOCATION NAME REGISTRATION APPARATUS AND LOCATION NAME REGISTRATION METHOD

(75) Inventor: Takashi Karimoto, Kanagawa (JP)

(73) Assignee: Sony Corporation, Tokyo (JP)

(*) Notice: Subject to any disclaimer, the term of this patent is extended or adjusted under 35 U.S.C. 154(b) by 335 days.

(21) Appl. No.: 12/497,044

(22) Filed: Jul. 2, 2009

(65) Prior Publication Data

US 2010/0053371 A1 Mar. 4, 2010

(30) Foreign Application Priority Data

Aug. 29, 2008 (JP) .................................. 2008-221712

(51) Int. Cl.
*H04N 5/222* (2006.01)
*H04N 5/76* (2006.01)

(52) U.S. Cl. ................................ 348/231.3; 348/333.02

(58) Field of Classification Search ............... 348/231.3, 348/143, 240.99, 333.02
See application file for complete search history.

(56) References Cited

U.S. PATENT DOCUMENTS

| | | | | |
|---|---|---|---|---|
| 2005/0046706 A1* | 3/2005 | Sesek et al. | ............... | 348/231.3 |
| 2007/0244634 A1* | 10/2007 | Koch et al. | ................. | 701/207 |
| 2007/0288197 A1* | 12/2007 | Martin | ........................ | 702/152 |
| 2008/0268876 A1* | 10/2008 | Gelfand et al. | ............... | 455/457 |
| 2008/0312824 A1* | 12/2008 | Jung | ............................. | 701/208 |
| 2009/0049408 A1* | 2/2009 | Naaman et al. | ............... | 715/835 |
| 2010/0250136 A1* | 9/2010 | Chen | ............................. | 701/300 |
| 2010/0295971 A1* | 11/2010 | Zhu | .......................... | 348/240.99 |

FOREIGN PATENT DOCUMENTS

| | | |
|---|---|---|
| JP | 2003-209886 | 7/2003 |
| JP | 2004-252081 | 9/2004 |
| JP | 2005-148939 | 6/2005 |
| JP | 2006-178804 | 7/2006 |

* cited by examiner

*Primary Examiner* — Tuan Ho
*Assistant Examiner* — Shahbaz Nazrul
(74) *Attorney, Agent, or Firm* — Oblon, Spivak, McClelland, Maier & Neustadt, L.L.P.

(57) ABSTRACT

A location name registration apparatus includes a reception unit configured to receive, from a picture-taking apparatus, picture data of a picture of an object taken by the picture-taking apparatus, picture-taking location information corresponding to the latitude and longitude of a picture-taking location acquired when the picture was taken, and object location information corresponding to the latitude and longitude of an object location of a target of picture-taking; a location name acquisition unit configured to acquire, from a location name storage unit, a picture-taking location name of the picture-taking location and to acquire, from the location name storage unit, an object location name of the object location; and a location name registration unit configured to register the picture-taking location name, the object location name, and the picture data in association with each other in a predetermined storage unit.

12 Claims, 19 Drawing Sheets

<u>2, 3, 4</u>

DO YOU WANT TO UPLOAD A PICTURE?

G2A YES    G2B NO

THE FOLLOWING LOCATION NAMES HAVE BEEN ADDED TO THE UPLOADED PICTURE:

PICTURE-TAKING LOCATION: IZU
OBJECT LOCATION: MT. FUJI

—PT1

PICTURE-TAKING LOCATION: IZU
OBJECT LOCATION: MT. FUJI

ENTER INFORMATION ON LOCATION
AND LOCATION NAME

G5A

| 1 | 2 | 3 | 4 | 5 | 6 | 7 | 8 | 9 | 0 | Back | space |
| q | w | e | r | t | y | u | i | o | p | ← | → |
| a | s | d | f | g | h | j | k | l |   | OK | |
| z | x | c | v | b | n | m |   |   |   | Cancel | |
|   |   | A | / | a | / | @ |   |   |   | Cancel | |

SELECT LOCATION NAMES
FROM CANDIDATES

☆ PICTURE-TAKING     ☆ OBJECT LOCATION
  LOCATION

☐ IZU                ☐ MT. FUJI
☐ NUMAZU             ☐ LAKE YAMANAKA
☐ FUJIKYU HIGHLAND   ☐ LAKE KAWAGUCHI

SELECT LOCATION NAMES
FROM CANDIDATES

☆ PICTURE-TAKING     ☆ OBJECT LOCATION
  LOCATION

☑ IZU                ☑ MT. FUJI
☐ NUMAZU             ☐ LAKE YAMANAKA
☐ FUJIKYU HIGHLAND   ☐ LAKE KAWAGUCHI

LOCATION NAME REGISTRATION APPARATUS AND LOCATION NAME REGISTRATION METHOD

BACKGROUND OF THE INVENTION

1. Field of the Invention

The present invention relates to a location name registration apparatus and a location name registration method, and is suitably applied, for example, to an information collecting server connected to a compact digital camera (hereinafter, simply referred to as a "digital camera").

2. Description of the Related Art

Since digital cameras have not been provided with a function of adding information on the location where a picture was taken to picture data of the picture, digital cameras have not been able to present the location where the picture was taken to a user.

In addition, even with a digital camera that has a function of providing information on the location where a picture was taken, only latitude and longitude information can be obtained using a global positioning system (GPS) function. Thus, information on the picture-taking of an object (hereinafter, referred to as "picture-taking information"), such as direction, picture-taking altitude, camera angle with respect to the object (the angle of elevation), is not obtained.

Thus, even when a user of a digital camera is able to go to the same place as that at which a picture was taken in accordance with latitude and longitude information, in order to take the same picture as the previously taken picture, it is necessary for the user to depend on their intuition while comparing the scenery in the previously taken picture with the scenery around the user.

A technique in which latitude and longitude calculated by a GPS receiving device contained in a cellular phone are transmitted to a positional information service center, the positional information service center generates the latest positional information data, and the positional information data is transmitted from the cellular phone to a digital camera, so that location name/facility name data is printed on a picture image captured by the digital camera, is disclosed, for example, in Japanese Unexamined Patent Application Publication No. 2003-209886.

SUMMARY OF THE INVENTION

A digital camera having the configuration described above is capable of obtaining a location name corresponding to the latitude and longitude calculated by the GPS receiving device, that is, a picture-taking location name (the name of the location where a picture was taken), and printing the picture-taking location name on a picture image. However, for example, an object location name (the name of the location where an object exists) corresponding to the location of the object, which is a target of picture-taking, is not obtained.

It is desirable to propose a location name registration apparatus and a location name registration method that are capable of searching for and automatically registering a picture-taking location name corresponding to a picture-taking location and an object location name corresponding to an object location.

According to embodiments of the present invention, there are provided a location name registration apparatus and a location name registration method including receiving, from a picture-taking apparatus, picture data of a picture of an object taken by the picture-taking apparatus, picture-taking location information corresponding to the latitude and longitude of a picture-taking location acquired when the picture was taken, and object location information corresponding to the latitude and longitude of an object location of a target of picture-taking; acquiring, from location name storage means, a picture-taking location name of the picture-taking location in accordance with the picture-taking location information, and acquiring, from the location name storage means, an object location name of the object location in accordance with the object location information; and registering the picture-taking location name, the object location name, and the picture data in association with each other in predetermined storage means.

Accordingly, the picture-taking location name and the object location name corresponding to the picture-taking location information and the object location information supplied from the picture-taking apparatus can be searched for and acquired, and the picture-taking location name, the object location name, and the picture data supplied from the picture-taking apparatus can be registered in advance in association with each other.

According to an embodiment of the present invention, a location name registration apparatus and a location name registration method that are capable of searching for and acquiring a picture-taking location name and an object location name corresponding to picture-taking location information and object location information supplied from a picture-taking apparatus, registering the picture-taking location name, the object location name, and picture data supplied from the picture-taking apparatus in association with each other in advance, and thus searching for and automatically registering the picture-taking location name and the object location name corresponding to the picture-taking location and the object location, can be realized.

BRIEF DESCRIPTION OF THE DRAWINGS

FIG. 15 is a schematic diagram showing a location name direct entry screen;

FIG. 16 is a schematic diagram showing a candidate presentation screen (1);

FIG. 17 is a schematic diagram showing a candidate presentation screen (2);

DESCRIPTION OF THE PREFERRED EMBODIMENTS

An embodiment of the present invention will be described with reference to the drawings.

(1) Entire Configuration of Camera Information Sharing System

Figure 1:
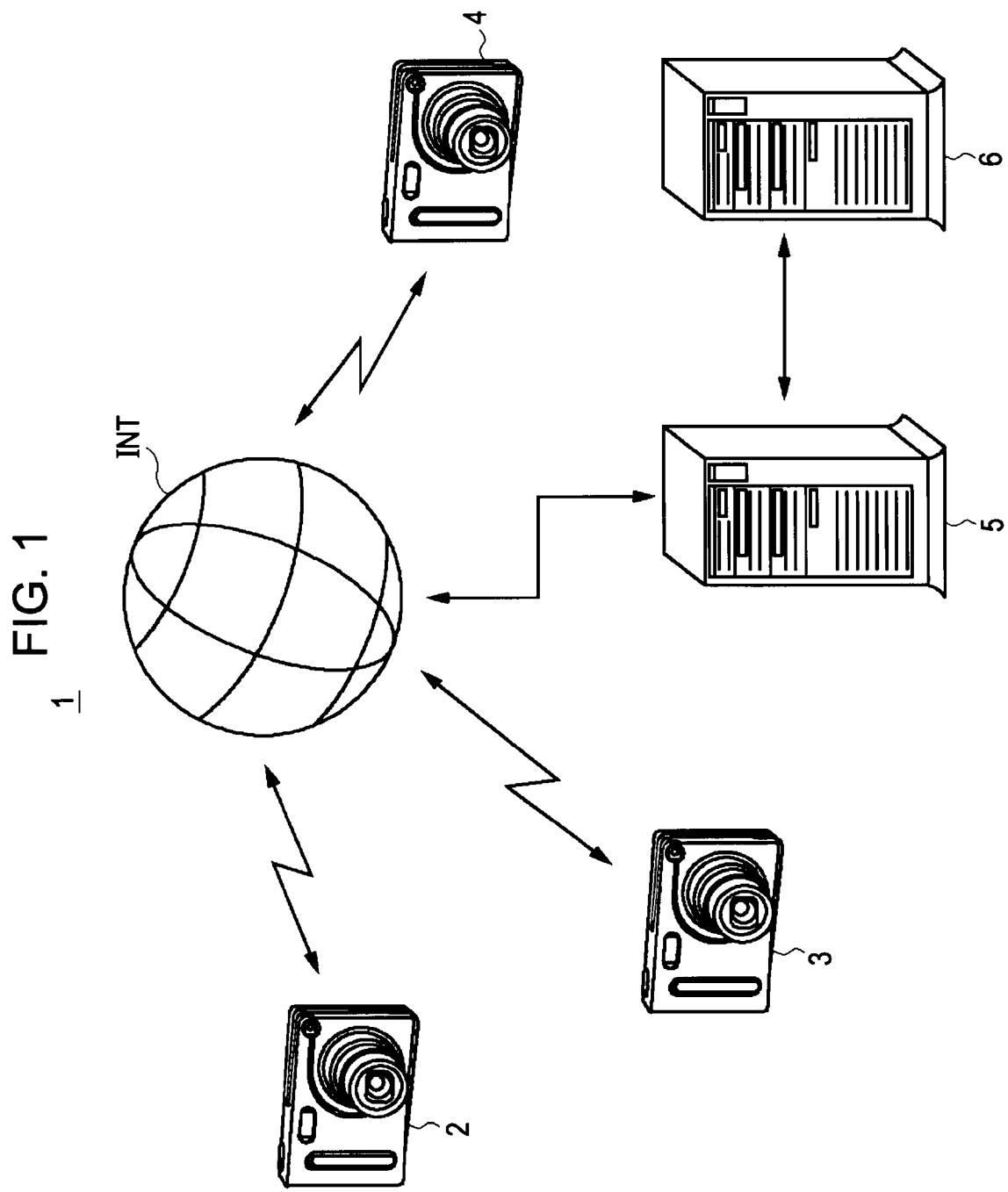
FIG. 1 is a schematic perspective view showing the entire configuration of a camera information sharing system according to an embodiment of the present invention.

FIG. 1 shows a camera information sharing system 1 according to an embodiment of the present invention. In the camera information sharing system 1, digital cameras 2 to 4 are connected to an information collecting server 5 through the Internet INT, and a location name server 6 is connected to the information collecting server 5.

The digital cameras 2 to 4 and the information collecting server 5 are not necessarily connected through a wire. For example, the digital cameras 2 to 4 and the information collecting server 5 may be connected through a wireless local-area network (LAN) based on the IEEE 802.11 series, Bluetooth®, or the like in accordance with a wireless communication method. Any form of connection can be adopted.

The digital cameras 2 to 4 have the same circuit configuration having basically the same function. Various types of information can be transferred between each of the digital cameras 2 to 4 and the information collecting server 5.

(2) Configuration of Digital Camera

The configuration of the digital cameras 2 to 4 will now be described. Since the digital cameras 2 to 4 have the same circuit configuration, the configuration of the digital camera 2 will be described by way of example. For convenience, the description of the configuration of the digital cameras 3 and 4 will be omitted.

Figure 2:
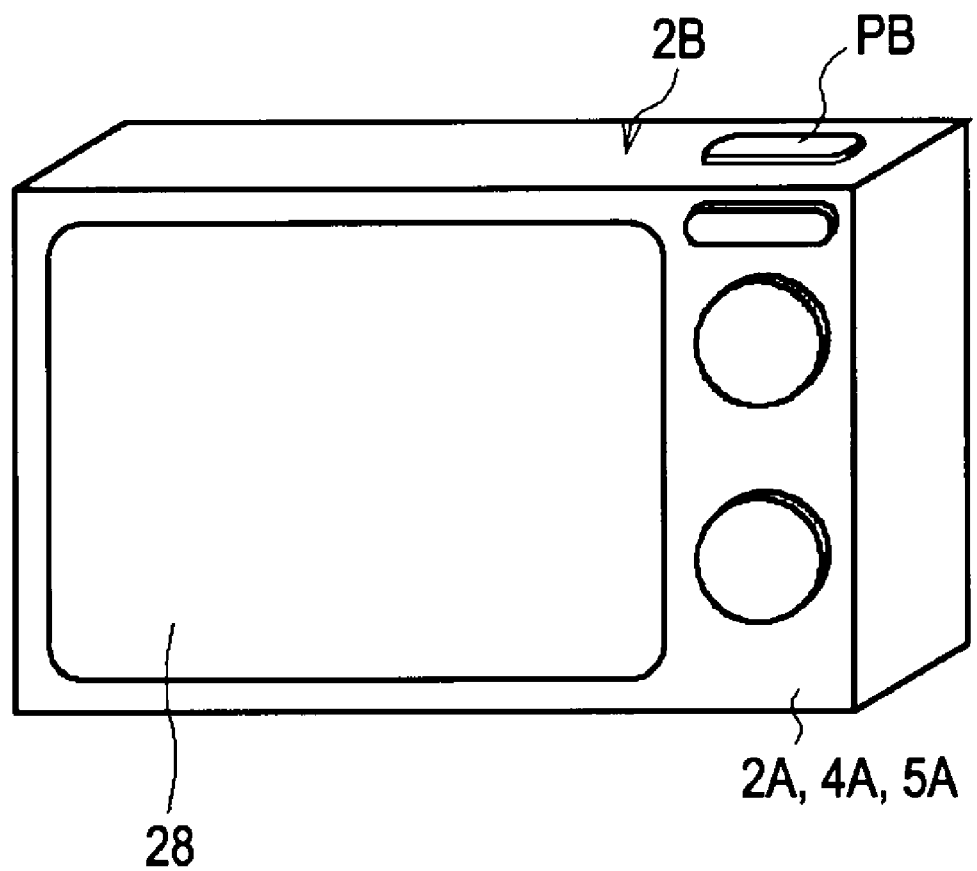
FIG. 2 is a schematic perspective view showing the external configuration of a digital camera.

Referring to FIG. 2, the digital camera 2 includes a display unit 28, which is a liquid crystal display of, for example, about three inches, on a back side 2A of the digital camera 2. On the display unit 28, an image to be captured, a playback image as a picture-taking result, or basic information, such as picture-taking conditions and picture-taking date and time, can be displayed.

In addition, a shutter button PB is provided in a right end portion of an upper face 2B of the digital camera 2, so that picture-taking can be performed at a time when the shutter button PB is pressed.

Figure 3:
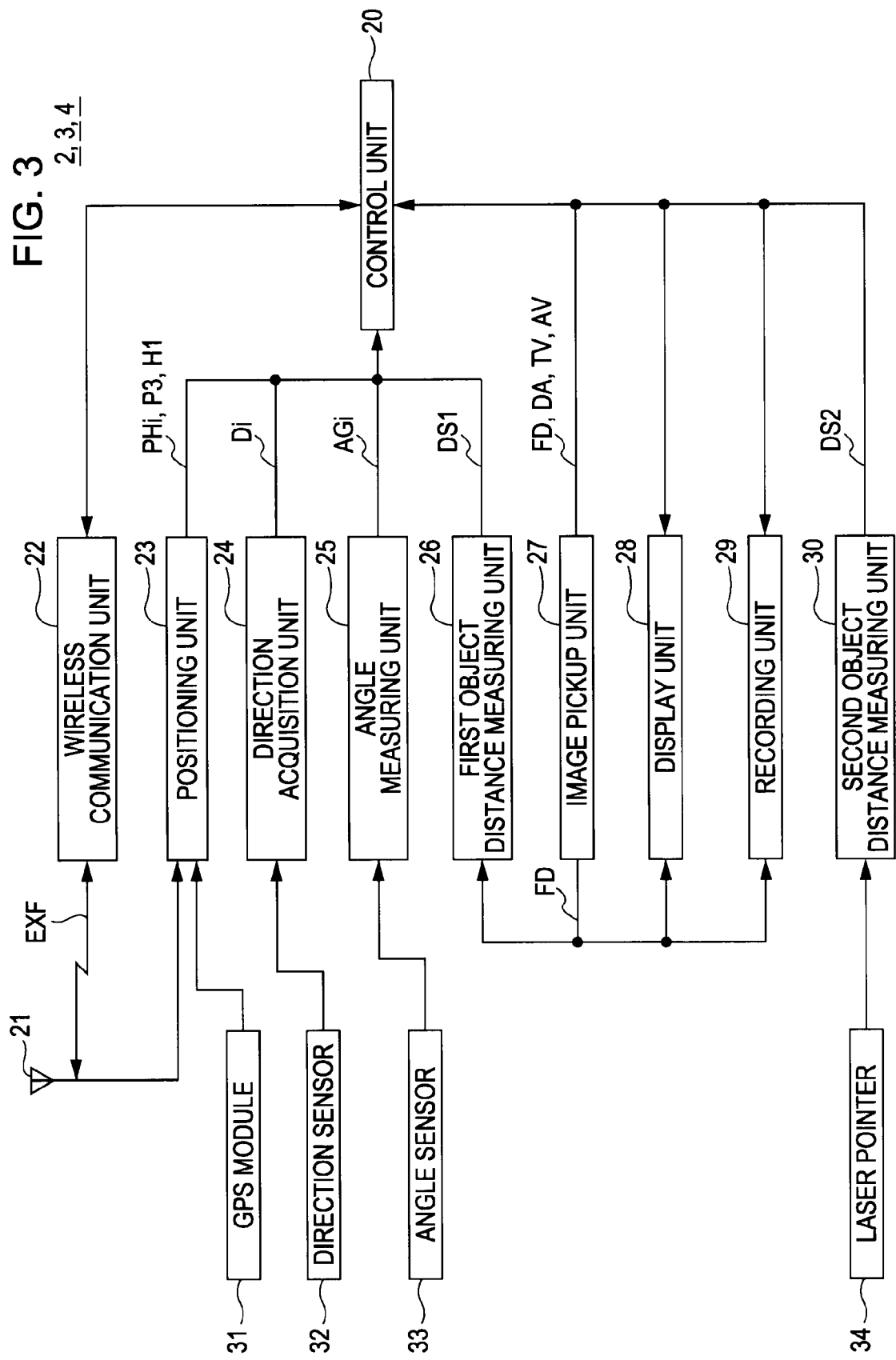
FIG. 3 is a schematic block diagram showing the circuit configuration of the digital camera.

As shown in FIG. 3, a control unit 20 including a central processing unit (CPU) controls the entire digital camera 2. In addition, the control unit 20 is capable of implementing various functions including a camera picture-taking function in accordance with a basic program and various application programs read from a read-only memory (ROM), which is not illustrated.

In actuality, the control unit 20 of the digital camera 2 is capable of displaying, on the display unit 28, picture data FD obtained by capturing a still image by using an image pickup unit 27 including a charge-coupled device (CCD) or the like.

The control unit 20 of the digital camera 2 is capable of causing a recording unit 29 to record the picture data FD in a recording medium (not illustrated), which is a removable memory, such as a removable semiconductor memory.

In addition, the control unit 20 of the digital camera 2 includes a GPS module 31 so that satellite information is obtained from a plurality of GPS satellites and transmitted to a positioning unit 23.

The control unit 20 of the digital camera 2 is capable of acquiring picture-taking location information PHi including latitude and longitude information P1 and altitude information H1 of a picture-taking location, which is the current position, by using the GPS module 31 and the positioning unit 23 mounted in the-center-of gravity portion of the digital camera 2 at a time when picture data FD is captured using the image pickup unit 27.

Instead of using the GPS module 31, the control unit 20 of the digital camera 2 may acquire, via an antenna 21, a service set identifier (SSID), which is an identifier for identifying an access point at which wireless communication can be performed, from the access point, and output the SSID to the positioning unit 23.

In this case, the positioning unit 23 is also capable of acquiring latitude and longitude information P2 of the current position by using a technique called "PlaceEngine" using a latitude and longitude database of the recording unit 29, in accordance with the SSID and the reception intensity of radio waves received from the access point via the antenna 21.

Originally, the latitude and longitude information P1 and the latitude and longitude information P2 should be the same. However, there might be a slight difference between the latitude and longitude information P1 and the latitude and longitude information P2 in accordance with a difference in a measuring method. Thus, the digital camera 2 is capable of selecting a method for adopting one of the latitude and longitude information P1 and the latitude and longitude information P2 and outputting the selected information as latitude and longitude information P3 or a method for calculating the average of the latitude and longitude information P1 and the latitude and longitude information P2 and outputting the average as the latitude and longitude information P3.

Thus, the control unit 20 of the digital camera 2 is capable of acquiring, in accordance with the latitude and longitude information P1 and the altitude information H1 acquired in accordance with satellite information received from the GPS module 31 and the latitude and longitude information P2 acquired in accordance with the SSID of the access point or the like, the picture-taking location information PHi including the ultimate latitude and longitude information P3 and the altitude information H1.

Figure 4:
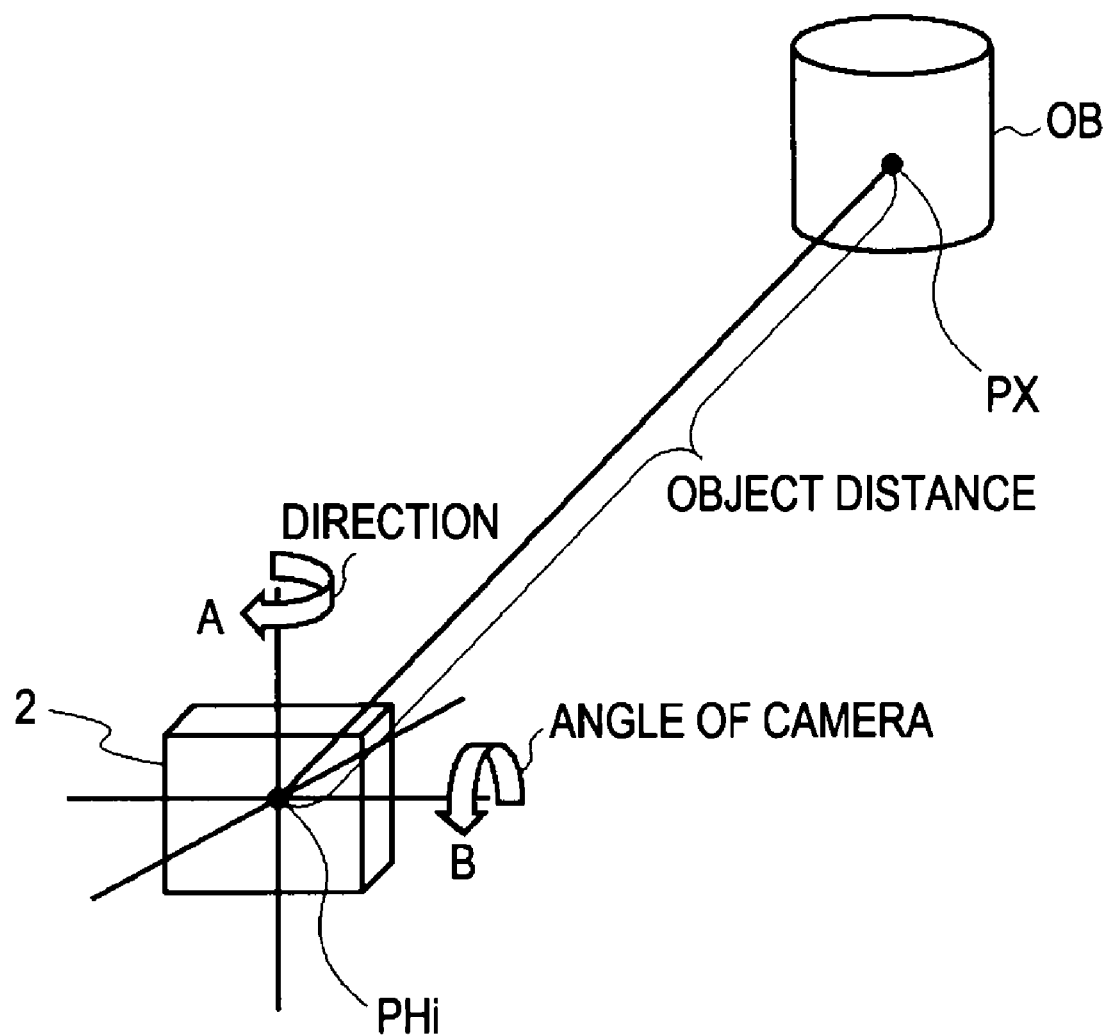
FIG. 4 is a schematic diagram showing the distance between the digital camera and an object.

Furthermore, as shown in FIG. 4, the control unit 20 of the digital camera 2 includes a direction sensor 32 (see FIG. 3) for detecting the horizontal direction of the digital camera 2 with respect to an object OB, which is represented as in the direction of arrow A. The direction sensor 32 transmits a detection result to a direction acquisition unit 24.

Thus, the control unit 20 of the digital camera 2 is capable of acquiring, by using the direction acquisition unit 24, direction information Di, which represents the picture-taking angle between the picture-taking location and the object OB, at a time when picture data FD is captured using the image pickup unit 27.

Furthermore, as shown in FIG. 4, the control unit 20 of the digital camera 2 includes an angle sensor 33 for detecting the camera angle (the angle of elevation) of the digital camera 2 with respect to the object OB, which is represented as in the direction of arrow B. The angle sensor 33 transmits a detection result to an angle measuring unit 25.

Thus, the control unit 20 of the digital camera 2 is capable of acquiring, by using the angle measuring unit 25, elevation angle information AGi by acquiring the camera angle (the angle of elevation) between the digital camera 2 and the object OB at a time when picture data FD is captured using the image pickup unit 27.

The control unit 20 of the digital camera 2 is capable of acquiring, by using a first object distance measuring unit 26, object distance information DS1 by calculating the distance from the digital camera 2 to the object OB (hereinafter, referred to as an "object distance"), as shown in FIG. 4, in accordance with the focal length, focus information, and the like in the image pickup unit 27 at a time when picture data FD is captured using the image pickup unit 27.

In a case where the object OB is located at infinity, the control unit 20 of the digital camera 2 outputs, to a second object distance measuring unit 30, information on a period of time necessary for detection of feedback light of a laser beam output via a laser pointer 34 to the object OB as a measurement result.

Thus, the control unit 20 of the digital camera 2 is capable of acquiring, by using the second object distance measuring unit 30, object distance information DS2 by calculating the distance from the digital camera 2 to the object OB.

That is, in a case where the object OB is located at a distance short enough to acquire focus information on the object OB, the control unit 20 acquires the object distance information DS1 by using the first object distance measuring unit 26. Meanwhile, in a case where the object OB is located far away, the control unit 20 acquires the object distance information DS2 by using the second object distance measuring unit 30.

Thus, the control unit 20 of the digital camera 2 is capable of calculating and acquiring latitude and longitude information PX (hereinafter, referred to as object location information) on the object OB in accordance with the object distance information DS1 or DS2, as well as the picture-taking location information PHi on the current position.

Note that the control unit 20 of the digital camera 2 receives, from the image pickup unit 27, picture-taking date and time information DA, shutter speed information TV, and aperture information AV corresponding to picture data FD, as well as the picture data FD received from the image pickup unit 27.

The control unit 20 of the digital camera 2 generates an exchangeable image file format (Exif) file EXF, in accordance with the picture data FD, the picture-taking location information PHi, the direction information Di, the elevation angle information AGi, the object location information PX, the picture-taking date and time information DA, the shutter speed information TV, and the aperture information AV.

Figure 5:
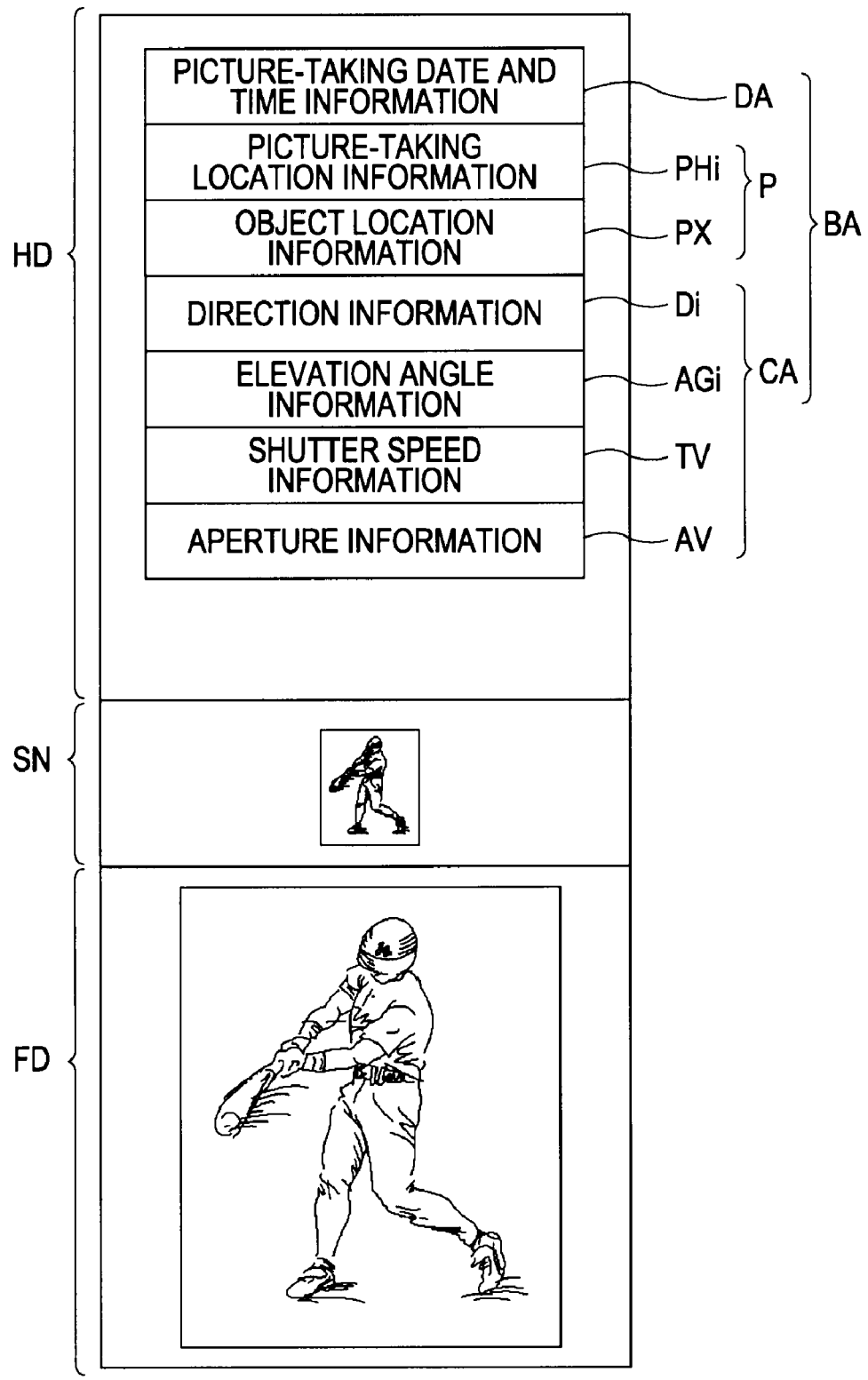
FIG. 5 is a schematic diagram showing the data structure of an Exif file.

Here, as shown in FIG. 5, an Exif file EXF includes picture data FD, thumbnail image data SN obtained by reducing the picture data FD into a predetermined size for list display, and a header HD.

The header HD includes basic information BA including picture-taking date and time information DA, location information P, and camera information CA. The location information P includes picture-taking location information PHi and object location information PX. The camera information CA includes direction information Di, elevation angle information AGi, shutter speed information TV, and aperture information AV.

The control unit 20 of the digital camera 2 causes the recording unit 29 to record an Exif file EXF having such a data structure in a predetermined recording medium. In addition, the control unit 20 transmits the Exif file EXF to the information collecting server 5 (see FIG. 1) via a wireless communication unit 22 and the antenna 21.

In the digital camera 2, the wireless communication unit 22, the positioning unit 23, the direction acquisition unit 24, the angle measuring unit 25, the first object distance measuring unit 26, and the second object distance measuring unit 30 are not necessarily configured as hardware. These units may be configured as software controlled by the control unit 20.

(3) Configuration of Information Collecting Server

Figure 6:
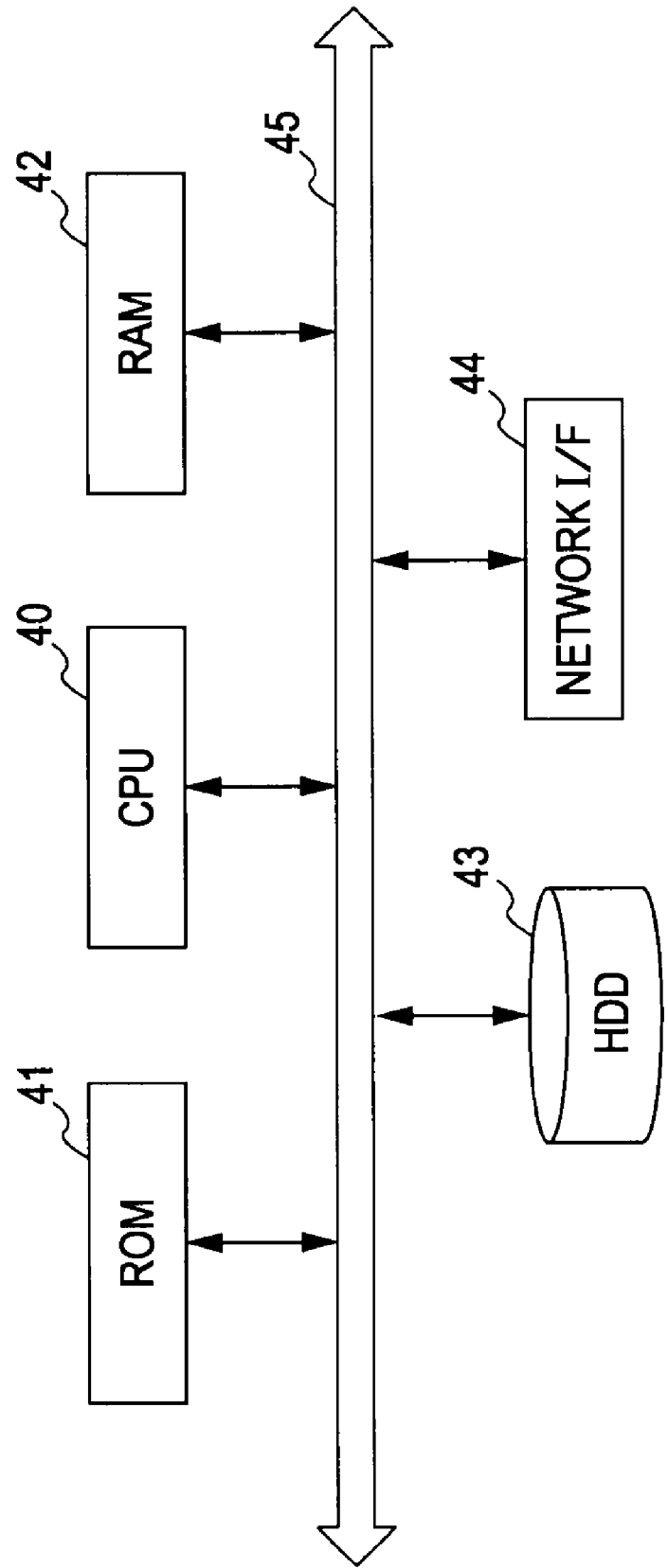
FIG. 6 is a schematic block diagram showing the circuit configuration of an information collecting server.

As shown in FIG. 6, a CPU 40 controls the entire information collecting server 5. The CPU 40 performs predetermined information collecting processing and the like in accordance with a basic program read from a hard disk drive 43 in accordance with a boot program stored in a read-only memory (ROM) 41 and launched on a random-access memory (RAM) 42 via a bus 45.

In addition, the information collecting server 5 is capable of performing an automatic location name registration process, a location name candidate presentation process, a picture evaluation process, an identical picture-taking environment guidance process, and the like, which will be described later, in accordance with various application programs read from the hard disk drive 43 and launched on the RAM 42.

In the information collecting server 5, the CPU 40, the ROM 41, the RAM 42, the hard disk drive 43, and a network interface 44 are connected to each other via the bus 45. The information collecting server 5 is capable of acquiring an Exif file EXF transmitted from the digital camera 2 via the network interface 44 and causing the hard disk drive 43 to store the Exif file EXF.

(4) Configuration of Location Name Server

Figure 7:
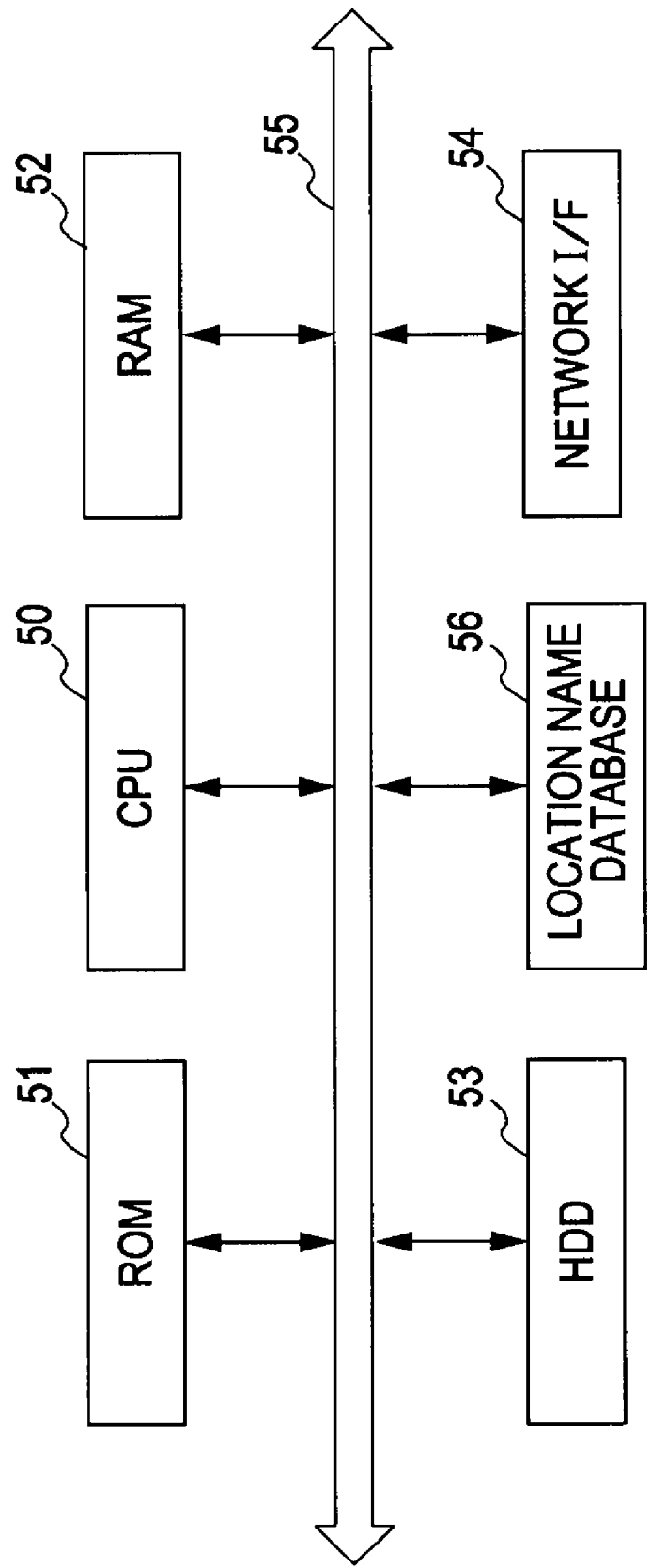
FIG. 7 is a schematic block diagram showing the circuit configuration of a location name server.

As shown in FIG. 7, a CPU 50 controls the entire location name server 6. The CPU 50 performs predetermined location name search processing and the like in accordance with a basic program read from a hard disk drive 53 in accordance with a boot program stored in a ROM 51 and launched on a RAM 52 via a bus 55.

In actuality, when receiving location information P, which includes picture-taking location information PHi and object location information PX, from the information collecting server 5 via a network interface 54, the CPU 50 of the location name server 6 searches a location name database 56 for a picture-taking location name and an object location name corresponding to the picture-taking location information PHi and the object location information PX.

When searching for and acquiring a picture-taking location name corresponding to the picture-taking location information PHi and an object location name corresponding to the object location information PX by referring to the location name database 56, the CPU 50 of the location name server 6 transmits the picture-taking location name and the object location name to the information collecting server 5 via the network interface 54.

In a case where a picture-taking location name corresponding to the picture-taking location information PHi and an object location name corresponding to the object location information PX are not found, the CPU 50 of the location name server 6 acquires a picture-taking location name including the picture-taking location information PHi and an object location name including the object location information PX as search results, and transmits the search results to the information collecting server 5.

(5) Automatic Location Name Registration Process

Figure 8:
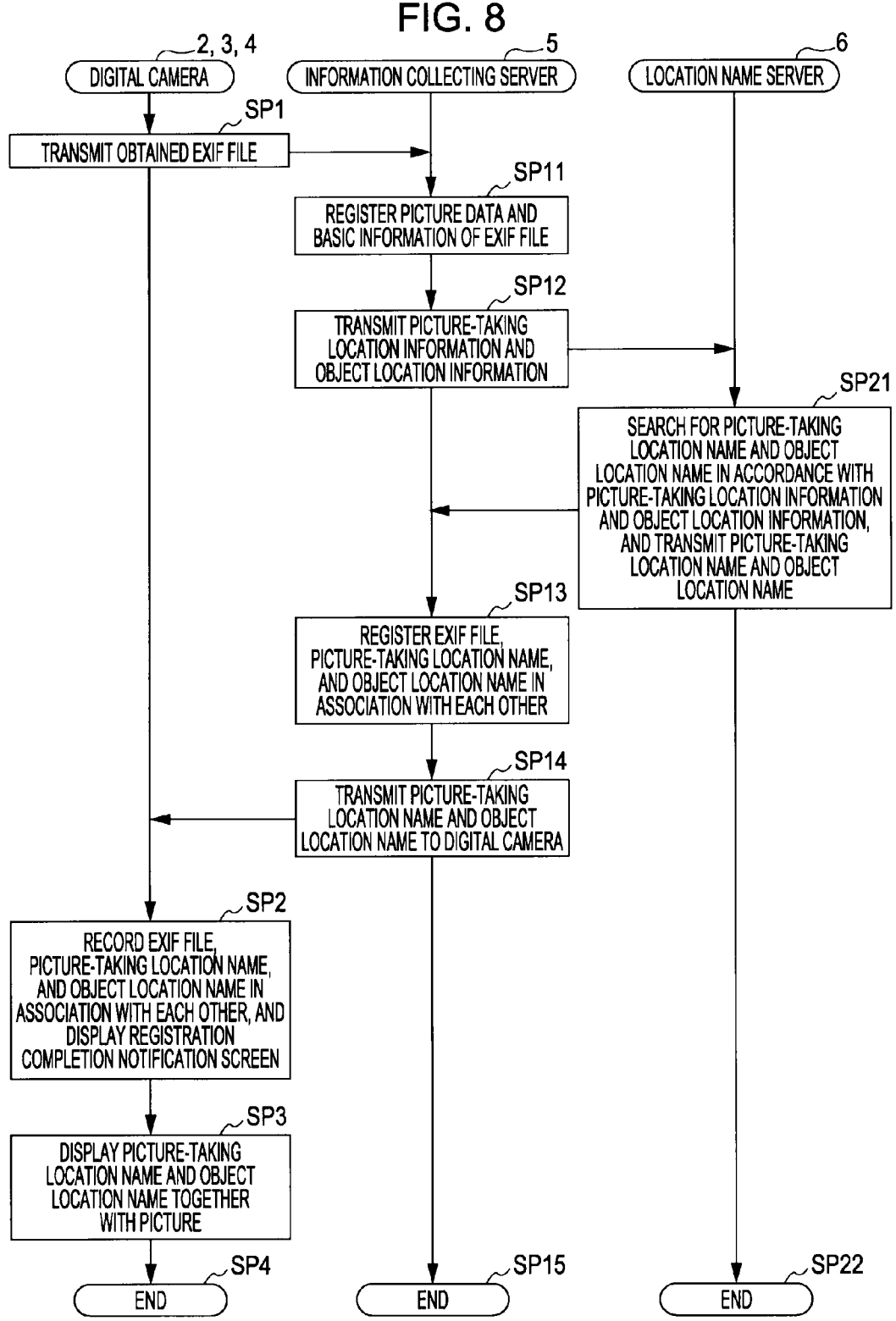
FIG. 8 is a flowchart of an automatic location name acquisition and registration process.

An automatic location name acquisition and registration process mainly performed by the information collecting server 5 in accordance with predetermined application software will now be explained with reference to FIG. 8.

In step SP1, the control unit 20 of the digital camera 2 causes the wireless communication unit 22 to transmit an Exif file EXF of a picture taken by a user to the information collecting server 5, and proceeds to step SP2. Note that the control unit 20 of the digital camera 2 may read, where necessary, an Exif file EXF of a picture stored in advance in the recording unit 29 and cause the wireless communication unit 22 to transmit the Exif file EXF to the information collecting server 5.

Figure 9:
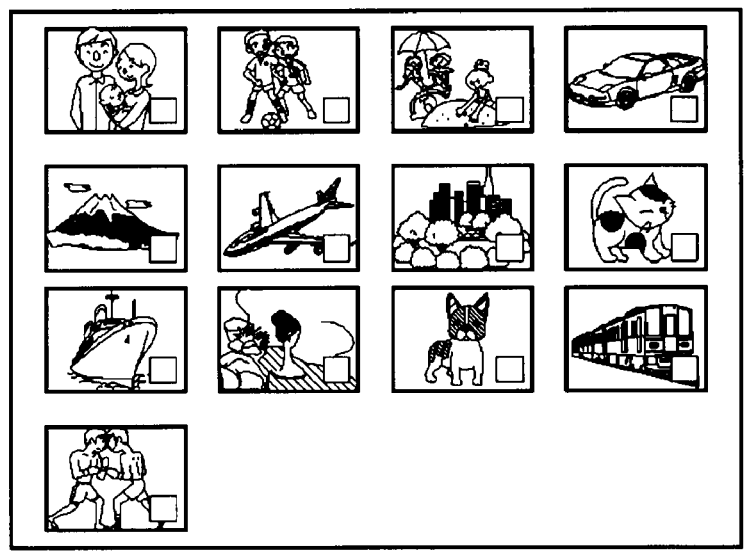
FIG. 9 is a schematic diagram showing a thumbnail list screen displayed on the digital camera.

In actuality, the control unit 20 of the digital camera displays, on the display unit 28, a thumbnail list screen G1, which shows a collection of a plurality of pictures stored by the recording unit 29 in a recording medium, as shown in FIG. 9.

Figure 10:
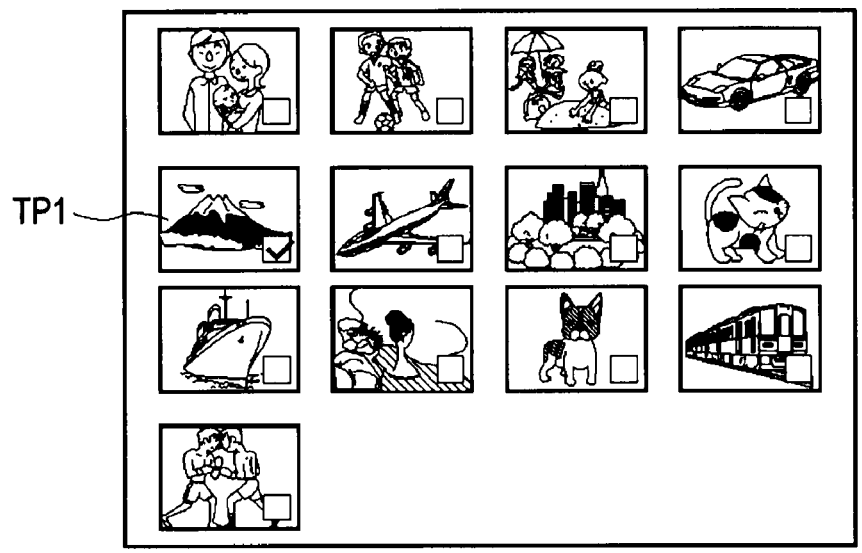
FIG. 10 is a schematic diagram showing the thumbnail list screen on which a tick is placed by the digital camera.

When confirming that a thumbnail picture TP1 has been selected by the user on the thumbnail list screen G1, as shown in FIG. 10, the control unit 20 of the digital camera 2 reads an Exif file EXF corresponding to the thumbnail picture TP1 from the recording unit 29.

Figures 11, 12, 13:
FIG. 11 is a schematic diagram showing an upload confirmation screen.
FIG. 12 is a schematic diagram showing a registration completion notification screen.
FIG. 13 is a schematic diagram showing a picture-taking result screen.

Then, the control unit 20 of the digital camera 2 generates an upload confirmation screen G2, as shown in FIG. 11, and displays, on the display unit 28, the upload confirmation screen G2 so as to be superimposed on the thumbnail list screen G1.

In a case where a "YES" button G2A on the upload confirmation screen G2 is selected, the control unit 20 of the digital camera 2 causes the wireless communication unit 22 to transmit to the information collecting server 5 an Exif file EXF corresponding to the thumbnail picture TP1 read from the recording unit 29.

Meanwhile, in a case where a "NO" button G2B on the upload confirmation screen G2 is selected, the control unit 20 of the digital camera 2 causes the upload confirmation screen G2 to disappear and displays the thumbnail list screen G1 again, without transmitting to the information collecting server 5 the Exif file EXF corresponding to the thumbnail picture TP1 read from the recording unit 29.

Here, in step SP11, the CPU 40 of the information collecting server 5 causes the hard disk drive 43 to register picture data FD, basic information BA, and the like of the Exif file EXF received from the digital camera 2. Then, the CPU 40 of the information collecting server 5 proceeds to step SP12.

In step SP12, the CPU 40 of the information collecting server 5 transmits location information P including picture-taking location information PHi and object location information PX, which is included in the basic information BA of the Exif file EXF, to the location name server 6. Then, the CPU 40 of the information collecting server 5 proceeds to step SP13.

Here, in step SP21, the location name server 6 searches the location name database 56 for a picture-taking location name and an object location name corresponding to the location information P (the picture-taking location information PHi and the object location information PX) received from the information collecting server 5, and transmits the search results to the information collecting server 5. Then, the location name server 6 proceeds to step SP22 to complete the process performed by the location name server 6.

In step SP13, the CPU 40 of the information collecting server 5 causes the hard disk drive 43 to register the picture-taking location name and the object location name received from the location name server 6 and the Exif file EXF in association with each other in a hard disk. Then, the CPU 40 of the information collecting server 5 proceeds to step SP14.

In step SP14, the CPU 40 of the information collecting server 5 transmits the picture-taking location name and the object location name to the digital camera 2. Then, the CPU 40 of the information collecting server 5 proceeds to step SP15 to complete the process performed by the information collecting server 5.

In step SP2, the control unit 20 of the digital camera 2 registers the picture-taking location name and the object location name received from the information collecting server 5 and the Exif file EXF by causing the recording unit 29 to record them in association with each other in a recording medium. Then, the control unit 20 of the digital camera 2 proceeds to step SP3.

Here, as shown in FIG. 12, the control unit 20 of the digital camera 2 generates a registration completion notification screen G3 indicating that the picture-taking location name, the object location name, and the Exif file EXF are registered in association with each other, and displays the registration completion notification screen G3 on the display unit 28.

In step SP3, as shown in FIG. 13, the control unit 20 of the digital camera 2 generates a picture-taking result screen G4 showing the combination of a picture PT1, which is based on the picture data FD transmitted as the Exif file EXF to the information collecting server 5, and the picture-taking location name and the object location name, which have been acquired from the information collecting server 5, and displays the picture-taking result screen G4 on the display unit 28. Then, the control unit 20 of the digital camera 2 proceeds to step SP4 to complete the process performed by the digital camera 2.

As described above, when receiving an Exif file EXF obtained by picture-taking with the digital camera 2, the information collecting server 5 of the camera information sharing system 1 searches for a picture-taking location name and an object location name corresponding to picture-taking location information PHi and object location information PX included in basic information BA of the Exif file EXF, and registers the picture-taking location name and the object location name in association with the Exif file EXF.

In addition, by transmitting the picture-taking location name and the object location name, which have been found in accordance with the picture-taking location information PHi and the object location information PX, to the digital camera 2, from which the Exif file EXF has been transmitted, the information collecting server 5 is capable of notifying the user of the digital camera 2 of the picture-taking location name and the object location name of the picture of the Exif file EXF.

(6) Location Name Candidate Presentation Process

Figure 14:
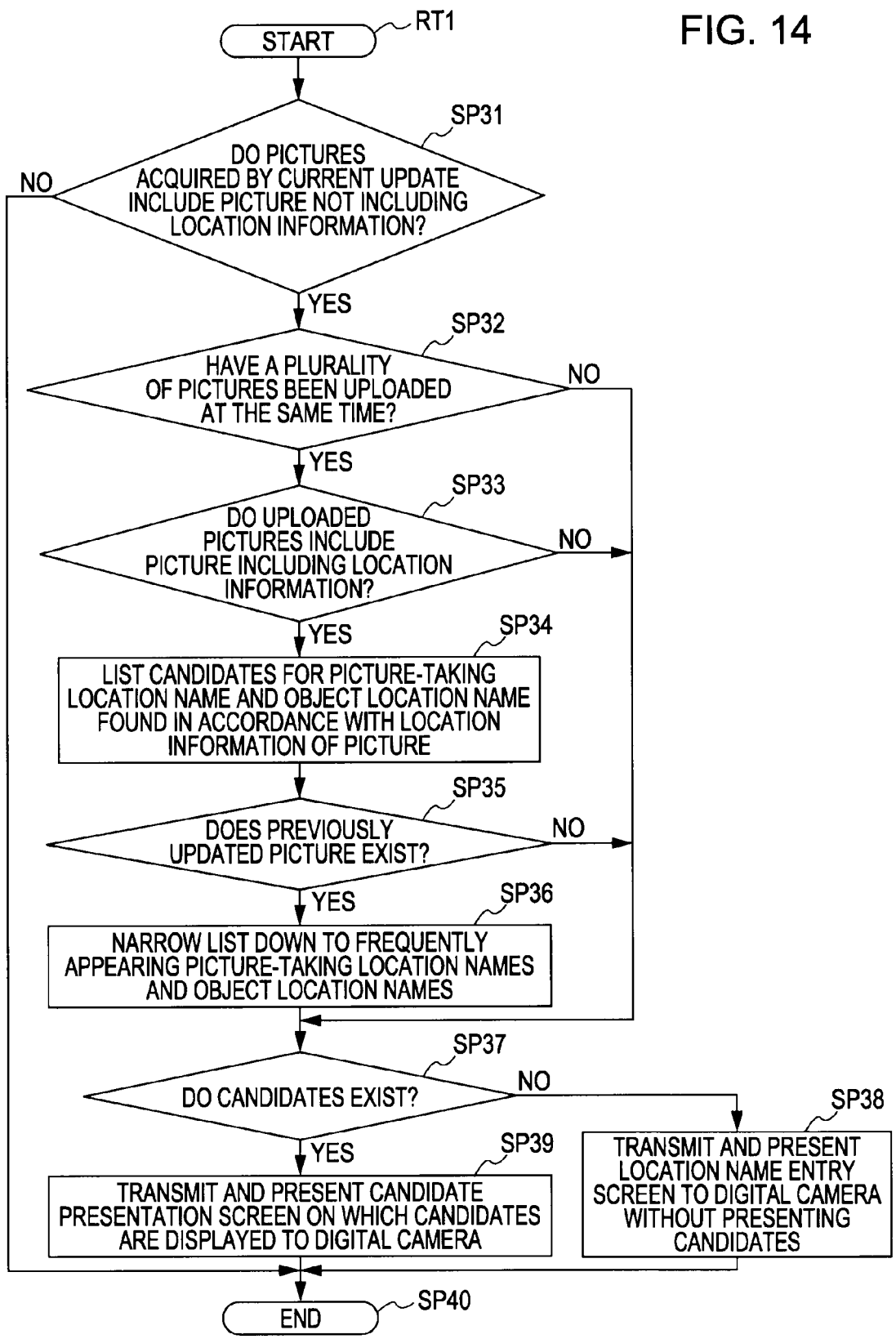
FIG. 14 is a schematic flowchart showing a location name candidate presentation process performed by the information collecting server.

As described above, the information collecting server 5 acquires a picture-taking location name and an object location name in accordance with location information P (picture-taking location information PHi and object location information PX) of an Exif file EXF received from the information collecting server 5. A location name candidate presentation process performed in a case where an Exif file EXF does not include location information P will be described with reference to FIG. 14.

The CPU 40 of the information collecting server 5 starts a routine RT1. In step SP31, the CPU 40 of the information collecting server 5 determines whether or not Exif files EXF acquired from the digital camera 2 by the current update include an Exif file EXF of a picture not including location information P (picture-taking location information PHi and object location information PX).

If the determination in step SP31 is negative, the determination result represents that the uploaded Exif files EXF do not include an Exif file EXF of a picture not including location information P and thus a picture-taking location name and an object location name can be acquired. Here, since it is not necessary for the CPU 40 of the information collecting server 5 to perform the location name candidate presentation process, the CPU 40 of the information collecting server 5 proceeds to step SP40 to terminate the process.

Meanwhile, if the determination in step SP31 is affirmative, the determination result represents that the Exif files EXF uploaded from the digital camera 2 include an Exif file EXF of a picture not including location information P and thus a picture-taking location name and an object location name for the Exif file EXF of the picture are not automatically acquired. Then, the CPU 40 of the information collecting server 5 proceeds to step SP32.

In step SP32, the CPU 40 of the information collecting server 5 determines whether or not Exif files EXF of a plurality of pictures have been uploaded at the same time. If the determination in step SP32 is negative, the determination result represents that only an Exif file EXF of a picture not including location information P has been uploaded. Then, the CPU 40 of the information collecting server 5 proceeds to step SP37.

Meanwhile, if the determination in step SP32 is affirmative, the determination result represents that not only an Exif file EXF of a picture not including location information P but also Exif files EXF of other pictures have been uploaded at the same time. Then, the CPU 40 of the information collecting server 5 proceeds to step SP33.

In step SP33, the CPU 40 of the information collecting server 5 determines whether or not the uploaded Exif files EXF include an Exif file EXF of a picture including location information P. If the determination in step SP33 is negative, the determination result represents that the uploaded Exif files EXF do not include any Exif file EXF of a picture including location information P. Then, the CPU 40 of the information collecting server 5 proceeds to step SP37.

Meanwhile, if the determination in step SP33 is affirmative, the determination result represents that the uploaded Exif files EXF include one or more Exif files EXF of pictures including location information P. Then, the CPU 40 of the information collecting server 5 proceeds to step SP34.

In step SP34, although the CPU 40 of the information collecting server 5 is not capable of acquiring a picture-taking location name and an object location name for an Exif file EXF of a picture not including location information P from the location name server 6, the CPU 40 of the information collecting server 5 lists picture-taking location names and object location names that have been found in accordance with the location information P stored in the Exif files EXF of the other pictures. Then, the CPU 40 of the information collecting server 5 proceeds to step SP35.

In step SP35, the CPU 40 of the information collecting server 5 determines whether or not there is an Exif file EXF of a picture that has previously been uploaded. If the determination in step SP35 is negative, the CPU 40 of the information collecting server 5 proceeds to step SP37. Meanwhile, if the determination in step SP35 is affirmative, the CPU 40 of the information collecting server 5 proceeds to step SP36.

In step SP36, in accordance with the frequency of the appearance of picture-taking location names and object location names in the Exif files EXF that have been uploaded and registered, the CPU 40 of the information collecting server 5 narrows down a list of candidates for a picture-taking location name and an object location name to be presented to the digital camera 2 from among the plurality of picture-taking location names and the plurality of object location names listed in step SP34. Then, the CPU 40 of the information collecting server 5 proceeds to step SP37.

In step SP37, the CPU 40 of the information collecting server 5 determines whether or not candidates for a picture-taking location name and an object location name exist.

If the determination in step SP37 is negative, the determination result represents that since an Exif file EXF of a picture including location information P has not been uploaded, which is as in a case where the determination in step SP32 or SP33 is negative, no list of picture-taking location names and object location names has not been made. Then, the CPU 40 of the information collecting server 5 proceeds to step SP38.

In step SP38, since no candidates for a picture-taking location name and an object location name exist, the CPU 40 of the information collecting server 5 generates a location name direct entry screen G5, as shown in FIG. 15, transmits the location name direct entry screen G5 to the digital camera 2, and urges the user to directly enter a location name in a location name entry field G5A of the location name direct entry screen G5. Then, the CPU 40 of the information collecting server 5 proceeds to step SP40 to complete the process.

Consequently, the control unit 20 of the digital camera 2 receives the entry of a picture-taking location name and an object location name recognized by the user on the location name direct entry screen G5, and transmits the entry results of the picture-taking location name and the object location name to the information collecting server 5.

As described above, the CPU 40 of the information collecting server 5 is capable of causing the hard disk drive 43 to register the Exif file EXF of a picture not including location information P and the picture-taking location name and the object location name entered on the location name direct entry screen G5 in association with each other in a hard disk.

Meanwhile, if the determination in step SP37 is affirmative, the determination result represents that candidates for a picture-taking location name and an object location name listed in step SP34 or candidates for a picture-taking location name and an object location name listed in step SP36 exist. Then, the CPU 40 of the information collecting server 5 proceeds to step SP39.

In step SP39, the CPU 40 of the information collecting server 5 generates a candidate presentation screen G6 on which candidates for a picture-taking location name and an object location name are displayed, as shown in FIG. 16, and presents the candidate presentation screen G6 to the digital camera 2. Then, the CPU 40 of the information collecting server 5 proceeds to step SP40 to complete the process.

Consequently, the control unit 20 of the digital camera 2 is capable of allowing the user to view and confirm, on the candidate presentation screen G6 (see FIG. 16), whether or not candidate names corresponding to a picture-taking location name and an object location name that are recognized by the user exist.

Then, when candidate names corresponding to a picture-taking location name (in this case, "Izu") and an object location name (in this case, "Mt. Fuji") that are recognized by the user have been selected on the candidate presentation screen G6, as shown in FIG. 17, the control unit 20 of the digital camera 2 transmits the selected picture-taking location name and object location name to the information collecting server 5.

Consequently, the CPU 40 of the information collecting server 5 is capable of causing the hard disk drive 43 to register the Exif file EXF of a picture not including location information P and the picture-taking location name and the object location name selected on the candidate presentation screen G6 in association with each other in the hard disk.

As described above, even in a case where an Exif file EXF of a picture uploaded from the digital camera 2 does not include location information P, the CPU 40 of the information collecting server 5 is capable of automatically searching for candidates for a picture-taking location name and an object location name for the Exif file EXF, presenting the found candidates to a user, and allowing the user to select candidates for the picture-taking location name and the object location name.

Only in a case where an Exif file EXF of a picture uploaded from the digital camera 2 does not include location information P and candidates for a picture-taking location name and an object location name for the Exif file EXF are not found, the CPU 40 of the information collecting server 5 allows a user to directly enter a picture-taking location name and an object location name on the location name direct entry screen G5.

(7) Picture Evaluation Process

Figure 18:
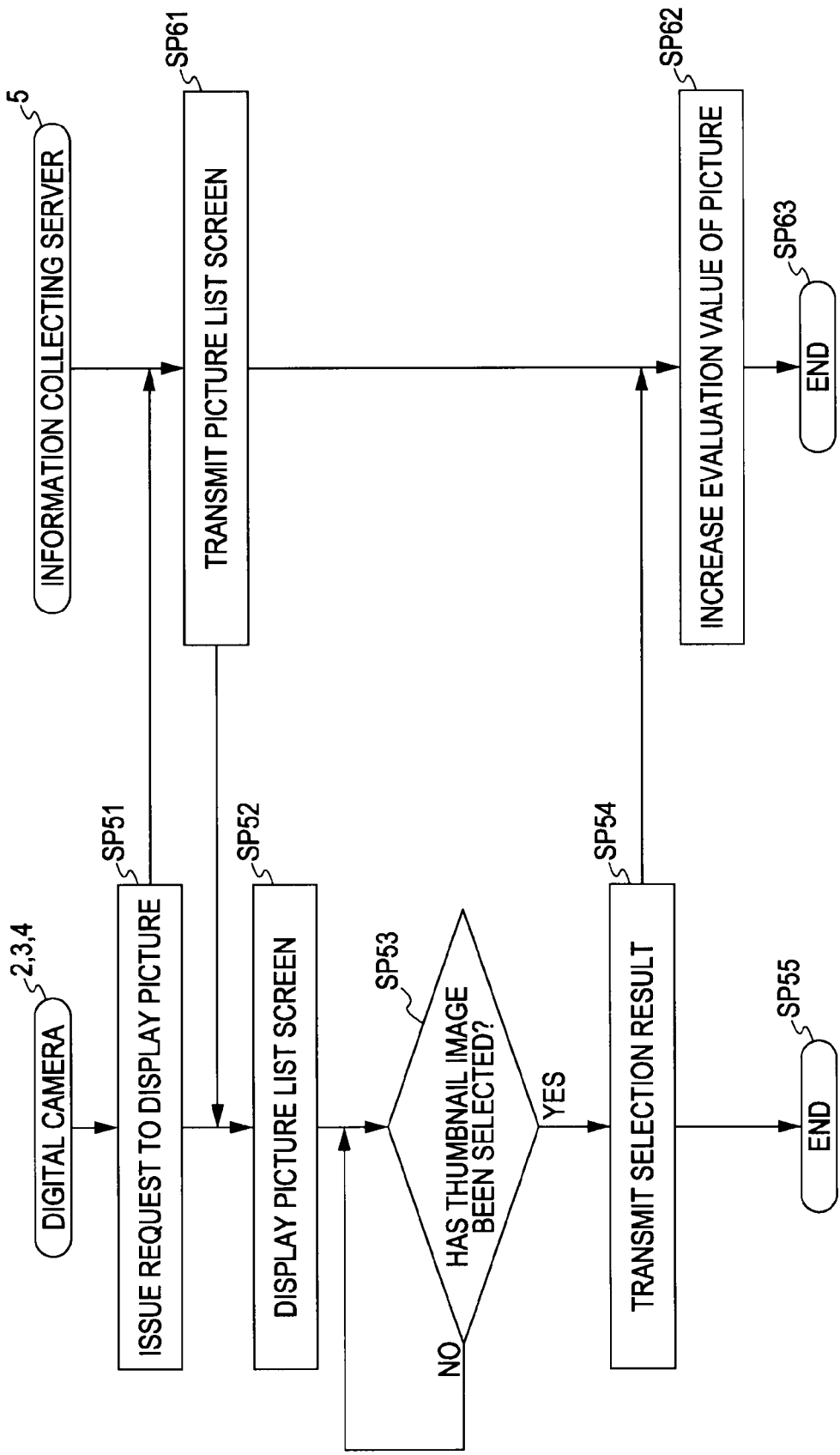
FIG. 18 is a flowchart showing a picture evaluation process.

A picture evaluation process mainly performed by the information collecting server 5 to evaluate a picture uploaded from the digital camera 2 in the camera information sharing system 1 will now be explained with reference to FIG. 18.

In step SP51, the control unit 20 of the digital camera 2 requests the information collecting server 5 to display pictures stored in the information collecting server 5. Then, the control unit 20 of the digital camera 2 proceeds to step SP52.

Figure 19:
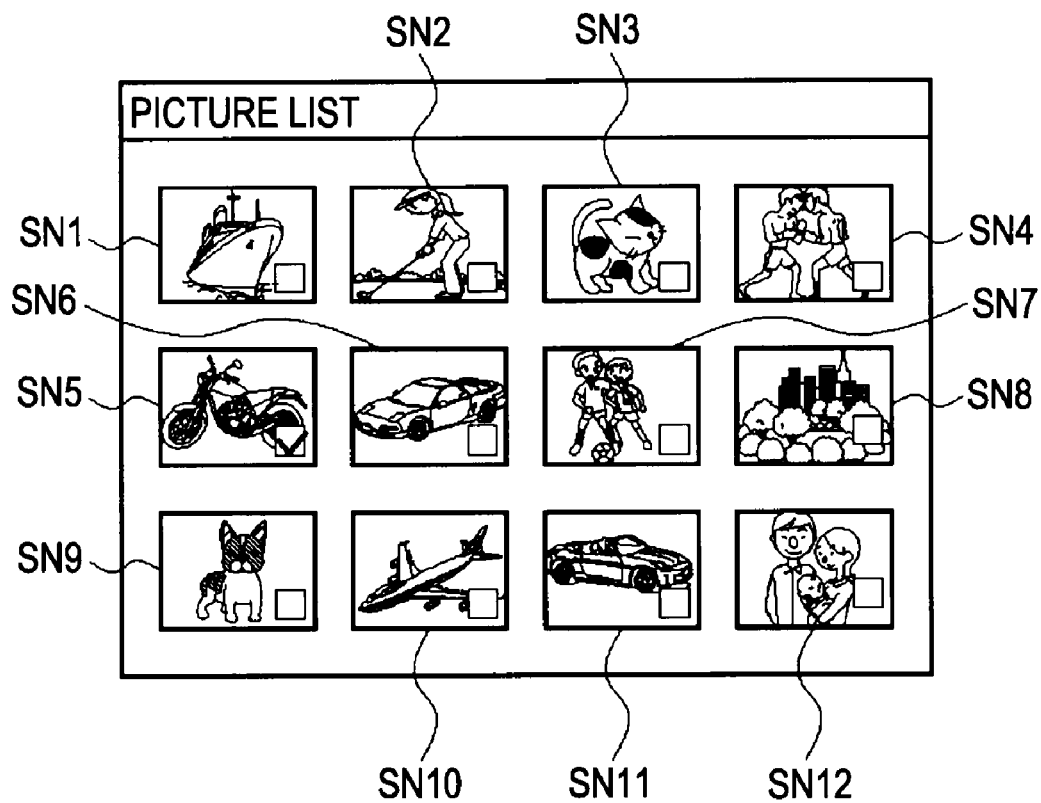
FIG. 19 is a schematic diagram showing a picture list screen.

Here, in step SP61, the CPU 40 of the information collecting server 5 generates a picture list screen G7 on which a plurality of pictures currently stored in the information collecting server 5 are displayed, as shown in FIG. 19, and transmits the picture list screen G7 to the digital camera 2. Then, the CPU 40 of the information collecting server 5 proceeds to step SP62.

In step SP52, the control unit 20 of the digital camera 2 displays on the display unit 28 the picture list screen G7 received from the information collecting server 5. Then, the control unit 20 of the digital camera 2 proceeds to step SP53.

On the picture list screen G7, thumbnail images SN1 to SN12 of a plurality of pictures stored in the information collecting server 5 are displayed as a list, so that a user can select a desired picture by ticking a check box corresponding to the picture.

In step SP53, the control unit 20 of the digital camera 2 determines whether or not a check box of one of the thumbnail images SN1 to SN12 has been ticked by a user on the picture list screen G7 and the one of the thumbnail images SN1 to SN12 has been selected.

If the determination in step SP53 is negative, the control unit 20 of the digital camera 2 waits until one of the thumbnail images SN1 to SN12 has been selected. Meanwhile, if one of the thumbnail images SN1 to SN12 has been selected, an affirmative result is obtained, and the control unit 20 of the digital camera 2 proceeds to step SP54.

In step SP54, the control unit 20 of the digital camera 2 notifies the information collecting server 5 of a selection result indicating that, for example, a picture corresponding to a thumbnail image SN5 selected in step SP53 has been specified by transmitting the selection result to the information collecting server 5. Then, the control unit 20 of the digital camera 2 proceeds to step SP55 to complete the process performed by the digital camera 2.

Here, in step SP62, the CPU 40 of the information collecting server 5 increases the evaluation value of an Exif file EXF of the picture corresponding to the thumbnail image SN5 for which the selection result has been transmitted from the digital camera 2 in step SP54 and registers the updated evaluation value. Then, the CPU 40 of the information collecting server 5 proceeds to step SP63 to complete the process performed by the information collecting server 5.

In actuality, for example, the CPU 40 of the information collecting server 5 sets the evaluation value of each of Exif files EXF of pictures corresponding to the thumbnails SN1 to SN12 to, for example, as a default, "five" out of "ten", and increases the evaluation value of the Exif file EXF corresponding to the thumbnail image SN5 selected by the digital camera 2 by one so that the evaluation value is updated to "six".

As described above, by using evaluation values of Exif files EXF of pictures corresponding to the thumbnail images SN1 to SN12, the CPU 40 of the information collecting server 5 is capable of generating and providing, for example, when generating and presenting the picture list screen G7 to the digital camera 2, the picture list screen G7 on which the thumbnail images SN1 to SN12 are arranged in the descending order of the evaluation values thereof.

Figure 20:
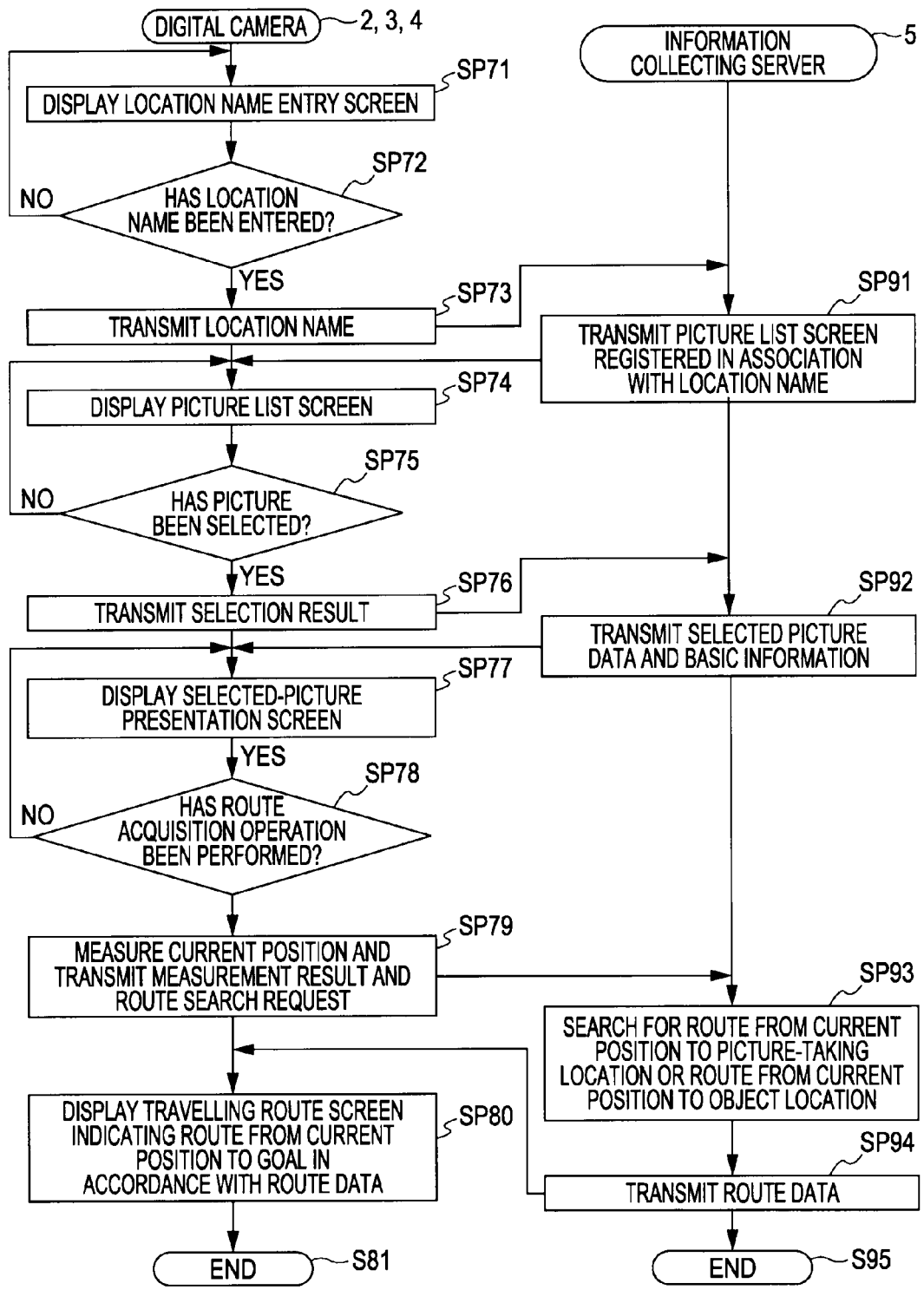
FIG. 20 is a flowchart showing an identical picture-taking environment guidance process of a picture searched for in accordance with a location name.

(8) Identical Picture-Taking Environment Guidance Process Based on Location Name An identical picture-taking environment guidance process mainly performed by the information collecting server 5 to allow a user to take a picture similar to a picture associated with a location name specified by the digital camera 2 under the same picture-taking environment in the camera information sharing system 1 will now be explained with reference to FIG. 20.

In this case, it is assumed that in the information collecting server 5 an Exif file EXF, a picture-taking location name, and an object location name of a picture are registered in association with each other in advance in a hard disk by the hard disk drive 43.

Figure 21:
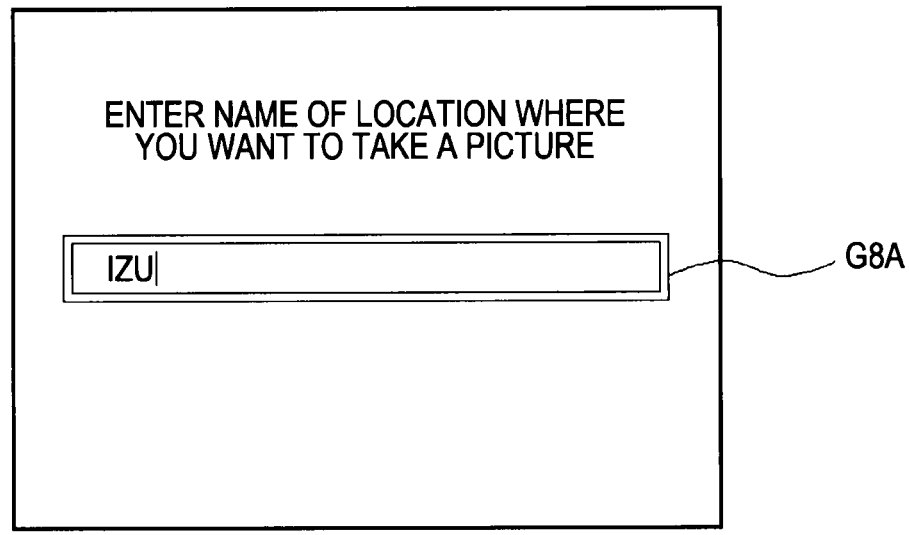
FIG. 21 is a schematic diagram showing a location name entry screen.

In step SP71, the control unit 20 of the digital camera 2 generates a location name entry screen G8, as shown in FIG. 21, and displays the location name entry screen G8 on the display unit 28, so that a user is urged to enter the name of the location where the user wants to take a picture in a location name entry field G8A. Then, the control unit 20 of the digital camera 2 proceeds to step SP72.

In step SP72, the control unit 20 of the digital camera 2 determines whether or not the location name of a picture-taking location desired by the user (for example, in this case, "Izu") has been entered in the location name entry field G8A of the location name entry screen G8 displayed on the display unit 28 in step SP71.

If the determination in step SP72 is negative, the determination result represents that no location name has been entered in the location name entry field G8A of the location name entry screen G8. Then, the control unit 20 of the digital camera 2 returns to step SP71 to wait until a location name has been entered while displaying the location name entry screen G8.

Meanwhile, if the determination in step SP72 is affirmative, the determination result represents that a location name has been entered in the location name entry field G8A of the location name entry screen G8. Then, the control unit 20 of the digital camera 2 proceeds to step SP73.

In step SP73, the control unit 20 of the digital camera 2 transmits information on the location name (in this case, "Izu") entered in the location name entry field G8A of the location name entry screen G8 to the information collecting server 5. Then, the control unit 20 of the digital camera 2 proceeds to step SP74.

Figure 22:
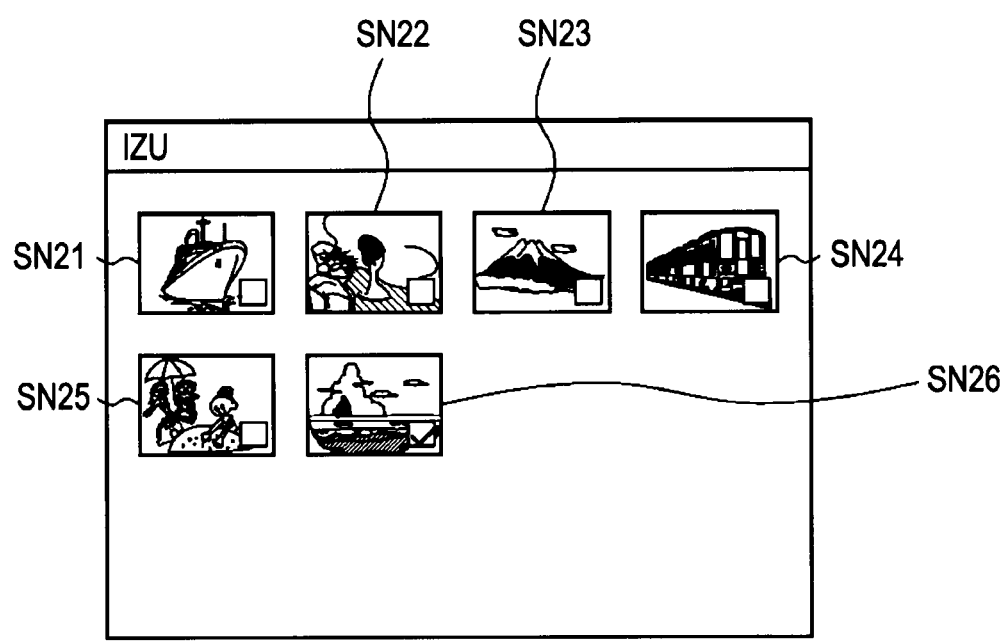
FIG. 22 is a schematic diagram showing a picture list screen corresponding to a location name.

Here, in step SP91, the CPU 40 of the information collecting server 5 generates a picture list screen G9 on which thumbnail images SN21 to SN26 corresponding to a plurality of pictures registered by the hard disk drive 43 in association with the location name received from the digital camera 2 are displayed, as shown in FIG. 22, and transmits the picture list screen G9 to the digital camera 2. Then, the CPU 40 of the information collecting server 5 proceeds to step SP92.

Note that when the CPU 40 of the information collecting server 5 generates the picture list screen G9 on which the thumbnail images SN21 to SN26 associated with the location name are displayed, the thumbnail images SN21 to SN26 are arranged in the descending order of the evaluation values thereof, as described above.

In step SP74, the control unit 20 of the digital camera 2 displays on the display unit 28 the picture list screen G9 received from the information collecting server 5, so that the user can view and confirm the thumbnail images SN21 to SN26 associated with the location name "Izu". Then, the control unit 20 of the digital camera 2 proceeds to step SP75.

In step SP75, the control unit 20 of the digital camera 2 determines whether or not one of the thumbnail images SN21 to SN26 on the picture list screen G9 has been selected. If the determination in step SP75 is negative, the control unit 20 of the digital camera 2 returns to step SP74 to wait until one of the thumbnail images SN21 to SN26 has been selected while displaying the picture list screen G9.

Meanwhile, if the determination in step SP75 is affirmative, the determination result represents that, for example, the thumbnail image SN23 on the picture list screen G9 has been selected. Then, the control unit 20 of the digital camera 2 proceeds to step SP76 to transmit the selection result to the information collecting server 5. Then, the control unit 20 of the digital camera 2 proceeds to step SP77.

Here, in step SP92, the CPU 40 of the information collecting server 5 reads from the hard disk drive 43 picture data FD and basic information BA of an Exif file EXF of a picture corresponding to the thumbnail image SN23, which is represented by the selection result received from the digital camera 2, and transmits the picture data FD and the basic information BA to the digital camera 2. Then, the CPU 40 of the information collecting server 5 proceeds to step SP93.

Figure 23:
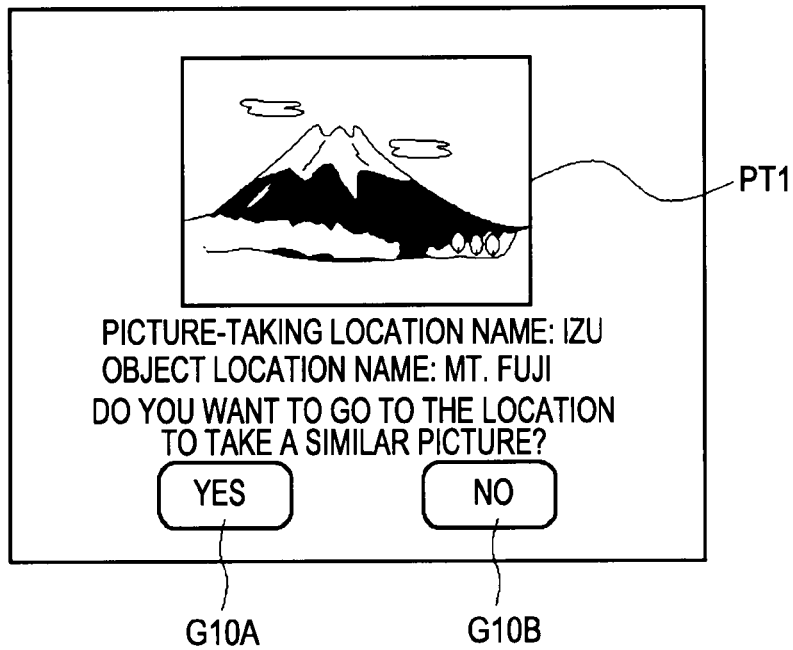
FIG. 23 is a schematic diagram showing a selected-picture presentation screen.

In step SP77, the control unit 20 of the digital camera 2 generates a selected-picture presentation screen G10 in accordance with the picture data FD received from the information collecting server 5, as shown in FIG. 23, and displays the selected-picture presentation screen G10 on the display unit 28. Then, the control unit 20 of the digital camera 2 proceeds to step SP78.

On the selected-picture presentation screen G10, a picture PT obtained by enlarging the thumbnail image SN23 is displayed. In addition, on the selected-picture presentation screen G10, a "YES" button G10A and a "NO" button G10B, which are associated with a message "Do you want to go to the location to take a similar picture?", are displayed so that the user who views and confirms the picture PT can select the "YES" button G10A or the "NO" button G10B.

In Step SP78, the control unit 20 of the digital camera 2 determines whether or not the "YES" button G10A on the selected-picture presentation screen G10 has been selected and thus a route acquisition operation has been performed. If the "NO" button G10B has been selected and thus a negative determination result is obtained in step SP78, the control unit 20 of the digital camera 2 returns to step SP77 to wait until a route acquisition operation has been performed while displaying the selected-picture presentation screen G10.

Meanwhile, if the determination in step SP78 is affirmative, the determination result represents that the user wants to take a picture similar to the picture PT displayed on the selected-picture presentation screen G10 or the user wants to go to the location where the picture PT was taken. Then, the control unit 20 of the digital camera 2 proceeds to step SP79.

In step SP79, in response to the route acquisition operation performed in step SP78, the control unit 20 of the digital camera 2 measures the current position of the digital camera 2 by using the GPS module 31.

Also in step SP79, the control unit 20 of the digital camera 2 transmits to the information collecting server 5 information on the current position obtained by the measurement result, a route search request for a route from the current position to the picture-taking location, and a route search request for a route from the current position to an object location. Then, the control unit 20 of the digital camera 2 proceeds to step SP80.

Here, in step SP93, the CPU 40 of the information collecting server 5 searches for a picture-taking location travelling route from the current position of the digital camera 2 to the picture-taking location and an object location travelling route from the current position to the object location in accordance with the route search requests received from the digital camera 2. Then, the CPU 40 of the information collecting server 5 proceeds to step SP94.

In step SP94, the CPU 40 of the information collecting server 5 transmits route data of the picture-taking location travelling route and the object location travelling route to the digital camera 2. Then, the CPU 40 of the information collecting server 5 proceeds to step SP95 to complete the process performed by the information collecting server 5.

In step SP80, the control unit 20 of the digital camera 2 displays the picture-taking location travelling route from the current position to the picture-taking location and/or the object location travelling route from the current position to the object location in accordance with the route data received from the information collecting server 5. Then, the control unit 20 of the digital camera 2 proceeds to step SP81 to complete the process performed by the digital camera 2.

Figure 24:
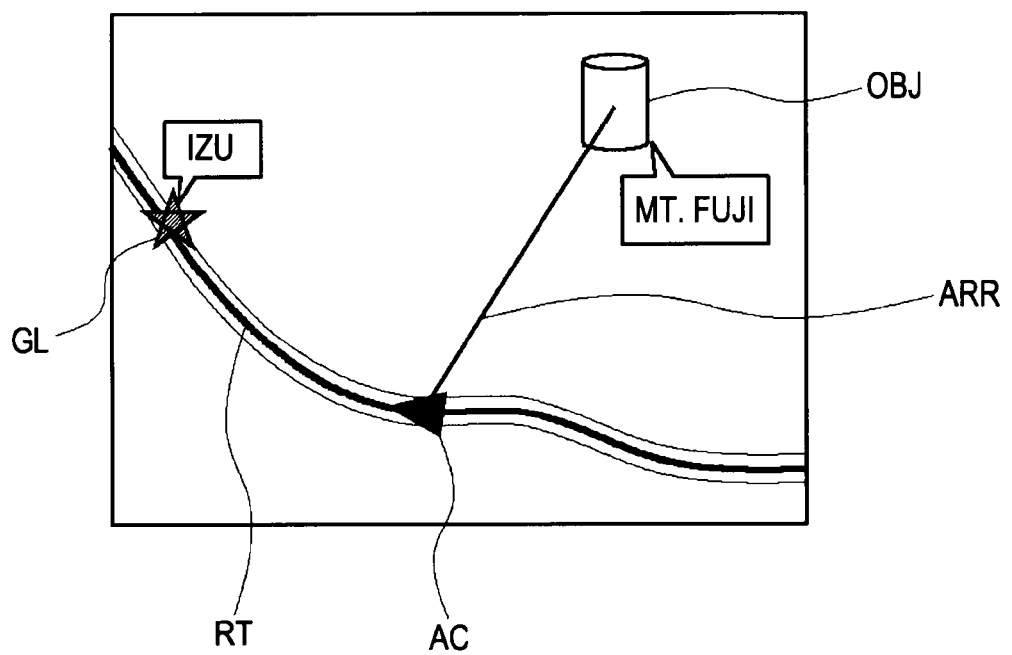
FIG. 24 is a schematic diagram showing a travelling route screen.

For example, the control unit 20 of the digital camera 2 displays on the display unit 28 a travelling route screen G11 generated in accordance with the route data, and presents a picture-taking location travelling route RT connecting a current position icon AC to a picture-taking location GL, which is a goal represented by the picture-taking location name (in this case, "Izu"), as shown in FIG. 24.

In addition, the control unit 20 of the digital camera 2 also displays an object location icon OBJ representing a target of picture-taking represented by the object location name (in this case, "Mt. Fuji") and an arrow ARR pointing from the current position icon AC to the object location icon OBJ, so that the user can view and confirm the positional and directional relationship between the current position of the user and the target of picture-taking at the same time.

As described above, in the camera information sharing system 1, when a user of the digital camera 2 selects a desired picture associated with a location name, the information collecting server 5 is capable of searching for a picture-taking location travelling route from the current position of the digital camera 2 to a picture-taking location name for the picture and an object location travelling route from the current position of the digital camera 2 to an object location name for the picture, and presenting the picture-taking location travelling route and the object location travelling route to the digital camera 2.

Here, the information collecting server 5 also transmits basic information BA including camera information CA to the digital camera 2. Thus, the information collecting server 5 is capable of presenting, to the user, direction information Di, elevation angle information AGi, shutter speed information TV, and aperture information AV of the digital camera 2 at the time of picture-taking.

Consequently, the user of the digital camera 2 is able to reliably arrive at a picture-taking location of a desired picture in accordance with a picture-taking location travelling route supplied from the information collecting server 5, set picture-taking conditions similar to those for the desired picture, and take a picture similar to the desired picture.

Figure 25:
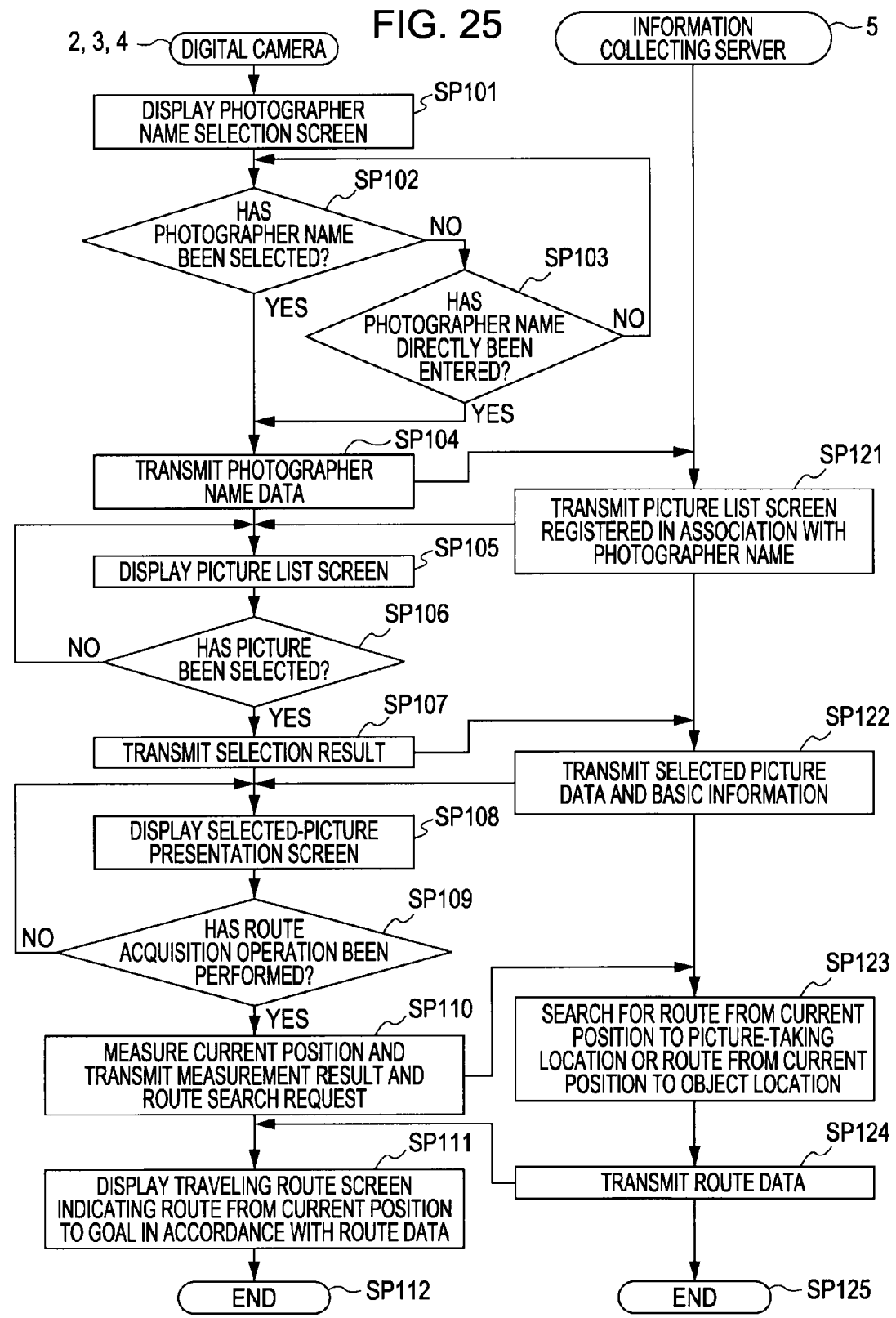
FIG. 25 is a flowchart of an identical picture-taking environment guidance process of a picture searched for in accordance with a photographer name.

(9) Identical Picture-Taking Environment Guidance Process Based on Photographer Name An identical picture-taking environment guidance process mainly performed by the information collecting server 5 to allow a user to take a picture similar to a picture associated with a photographer name specified by the digital camera 2 under the same picture-taking environment in the camera information sharing system 1 will now be explained with reference to FIG. 25.

In this case, it is assumed that in the information collecting server 5 an Exif file EXF and a photographer name of a picture are registered in association with each other in advance in a hard disk by the hard disk drive 43.

Figure 26:
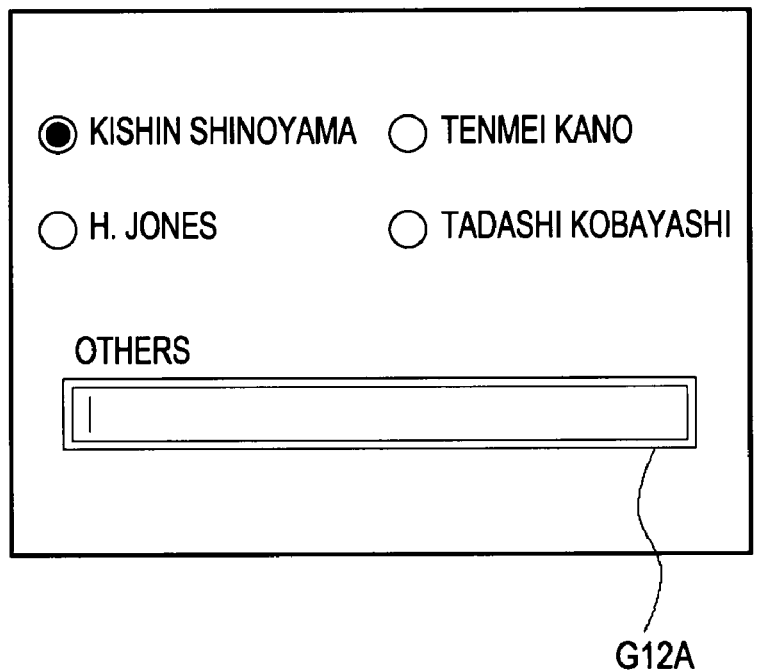
FIG. 26 is a schematic diagram showing a photographer name selection screen.

In step SP101, the control unit 20 of the digital camera 2 generates a photographer name selection screen G12, as shown in FIG. 26, and displays the photographer name selection screen G12 on the display unit 28, so that a user is urged to specify a desired photographer name. Then, the control unit 20 of the digital camera 2 proceeds to step SP102.

In step SP102, the control unit 20 of the digital camera 2 determines whether or not a check box corresponding to the desired photographer name (for example, in this case, "Kishin Shinoyama") has been ticked on the photographer name selection screen G12 displayed on the display unit 28 in step SP101.

If the determination in step SP102 is negative, the determination result represents that no desired photographer name has been selected on the photographer name selection screen G12. Then, the control unit 20 of the digital camera 2 proceeds to step SP103.

In step SP103, the control unit 20 of the digital camera 2 determines whether or not a desired photographer name not included in photographer name candidates has been directly entered in an entry field G12A.

If the determination in step SP103 is negative, the determination result represents that no photographer name has been specified. Then, the control unit 20 of the digital camera 2 returns to step SP102 to wait until a photographer name has been specified on the photographer name selection screen G12.

Meanwhile, if the determination in step SP102 or SP103 is affirmative, the determination result represents that a photographer name desired by the user has been specified on the photographer name selection screen G12. Then, the control unit 20 of the digital camera 2 proceeds to step SP104.

In step SP104, the control unit 20 of the digital camera 2 transmits to the information collecting server 5 photographer name data indicating the photographer name specified on the photographer name selection screen G12. Then, the control unit 20 of the digital camera 2 proceeds to step SP105.

Figure 27:
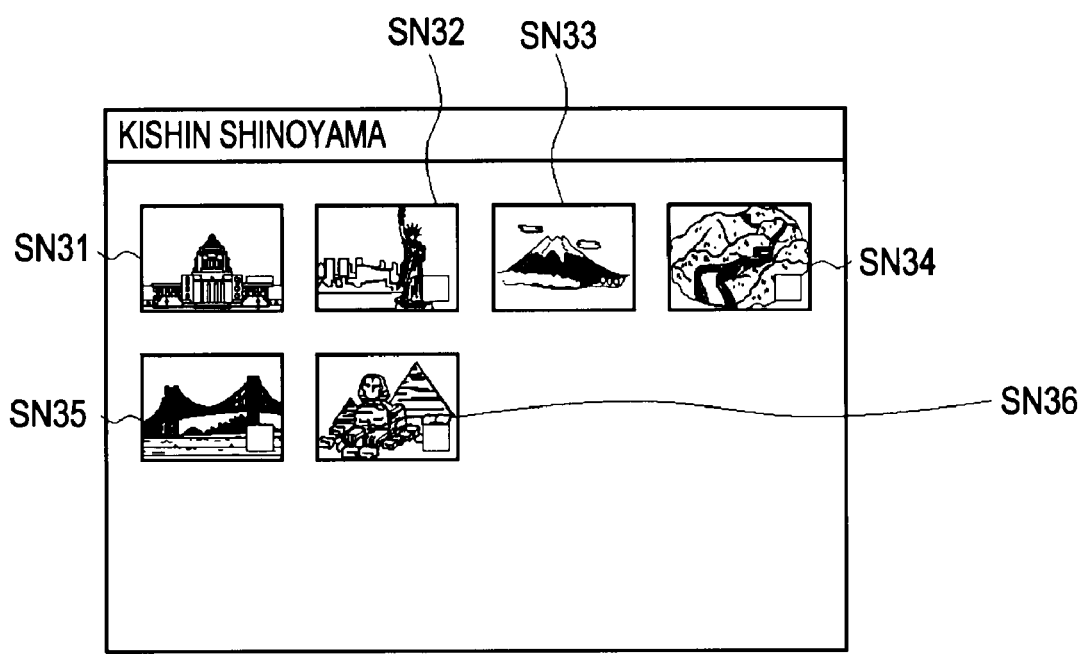
FIG. 27 is a schematic diagram showing a picture list screen corresponding to a photographer name.

Here, in step SP121, the CPU 40 of the information collecting server 5 generates a picture list screen G13 on which thumbnail images SN31 to SN36 registered by the hard disk drive 43 in association with the photographer name received from the digital camera 2 are displayed, as shown in FIG. 27, and transmits the picture list screen G13 to the digital camera 2. Then, the CPU 40 of the information collecting server 5 proceeds to step SP122.

Note that when the CPU 40 of the information collecting server 5 generates the picture list screen G13 on which the thumbnail images SN31 to SN36 associated with the photographer name are displayed, the thumbnail images SN31 to SN36 are arranged in the descending order of the evaluation values thereof, as described above.

In step SP105, the control unit 20 of the digital camera 2 displays on the display unit 28 the picture list screen G13 received from the information collecting server 5, so that the user can view and confirm the thumbnail images SN31 to SN36 associated with the photographer name "Kishin Shinoyama". Then, the control unit 20 of the digital camera 2 proceeds to step SP106.

In step SP106, the control unit 20 of the digital camera 2 determines whether or not one of the thumbnail images SN31 to SN36 on the picture list screen G13 has been selected. If the determination in step SP106 is negative, the control unit 20 of the digital camera 2 returns to step SP105 to wait until one of the thumbnail images SN31 to SN36 has been selected while displaying the picture list screen G13.

Meanwhile, if the determination in step SP106 is affirmative, the determination result represents that, for example, a picture corresponding to the thumbnail image SN33 on the picture list screen G13 has been selected. Then, the control unit 20 of the digital camera 2 proceeds to step SP107 to transmit the selection result to the information collecting server 5. Then, the control unit 20 of the digital camera 2 proceeds to step SP108.

Here, in step SP122, the CPU 40 of the information collecting server 5 reads from the hard disk drive 43 picture data FD and basic information BA of an Exif file EXF of the picture corresponding to the thumbnail image SN33, which is represented by the selection result received from the digital camera 2, and transmits the picture data FD and the basic information BA to the digital camera 2. Then, the CPU 40 of the information collecting server 5 proceeds to step SP123.

In step SP108, the control unit 20 of the digital camera 2 generates the selected-picture presentation screen G10 in accordance with the picture data FD received from the information collecting server 5, as shown in FIG. 23, and displays the selected-picture presentation screen G10 on the display unit 28. Then, the control unit 20 of the digital camera 2 proceeds to step SP109.

On the selected-picture presentation screen G10, a picture PT obtained by enlarging the thumbnail image SN33 is displayed. In addition, on the selected-picture presentation screen G10, the "YES" button G10A and the "NO" button G10B, which are associated with a message "Do you want to go to the location to take a similar picture?", are displayed so that the user who views and confirms the picture PT can select the "YES" button G10A or the "NO" button G10B.

In Step SP109, the control unit 20 of the digital camera 2 determines whether or not the "YES" button G10A on the selected-picture presentation screen G10 has been selected and thus a route acquisition operation has been performed. If the "NO" button G10B has been selected and thus a negative determination result is obtained in step SP109, the control unit 20 of the digital camera 2 returns to step SP108 to wait until a route acquisition operation has been performed while displaying the selected-picture presentation screen G10.

Meanwhile, if the determination in step SP109 is affirmative, the determination result represents that the user wants to take a picture similar to the picture PT displayed on the selected-picture presentation screen G10 or the user wants to go to the location where the picture PT was taken. Then, the control unit 20 of the digital camera 2 proceeds to step SP110.

In step SP110, in response to the route acquisition operation performed in step SP109, the control unit 20 of the digital camera 2 measures the current position of the digital camera 2 by using the GPS module 31.

Also in step SP110, the control unit 20 of the digital camera 2 transmits to the information collecting server 5 information on the current position obtained by the measurement result, a route search request for a route from the current position to the picture-taking location, and a route search request for a route from the current position to an object location. Then, the control unit 20 of the digital camera 2 proceeds to step SP111.

Here, in step SP123, the CPU 40 of the information collecting server 5 searches for a picture-taking location travelling route from the current position of the digital camera 2 to the picture-taking location and an object location travelling route from the current position to the object location in accordance with the route search requests received from the digital camera 2. Then, the CPU 40 of the information collecting server 5 proceeds to step SP124.

In step SP124, the CPU 40 of the information collecting server 5 transmits route data of the picture-taking location travelling route and the object location travelling route to the digital camera 2. Then, the CPU 40 of the information collecting server 5 proceeds to step SP125 to complete the process performed by the information collecting server 5.

In step SP111, the control unit 20 of the digital camera 2 displays the picture-taking location travelling route from the current position to the picture-taking location and/or the object location travelling route from the current position to the object location in accordance with the route data received from the information collecting server 5. Then, the control unit 20 of the digital camera 2 proceeds to step SP112 to complete the process performed by the digital camera 2.

For example, the control unit 20 of the digital camera 2 displays on the display unit 28 the travelling route screen G11 generated in accordance with the route data, and presents a picture-taking location travelling route RT connecting a current position icon AC to a picture-taking location GL, which is a goal represented by the picture-taking location name (in this case, "Izu"), as shown in FIG. 24.

In addition, the control unit 20 of the digital camera 2 also displays an object location icon OBJ representing a target of picture-taking represented by the object location name (in this case, "Mt. Fuji") and an arrow ARR pointing from the current position icon AC to the object location icon OBJ, so that the user can view and confirm the positional and directional relationship between the current position of the user and the target of picture-taking.

As described above, in the camera information sharing system 1, when a user of the digital camera 2 selects a desired picture associated with a photographer name, the information collecting server 5 is capable of searching for a picture-taking location travelling route from the current position of the digital camera 2 to a picture-taking location name for the picture and an object location travelling route from the current position of the digital camera 2 to an object location name for the picture, and presenting the picture-taking location travelling route and the object location travelling route to the digital camera 2.

Here, the information collecting server 5 also transmits basic information BA including camera information CA to the digital camera 2. Thus, the information collecting server 5 is capable of presenting, to the user, direction information Di, elevation angle information AGi, shutter speed information TV, and aperture information AV of the digital camera 2 at the time of picture-taking.

Consequently, the user of the digital camera 2 is able to reliably arrive at a picture-taking location of a desired picture in accordance with a picture-taking location travelling route supplied from the information collecting server 5, set picture-taking conditions similar to those for the desired picture, and take a picture similar to the desired picture.

(10) Operations and Effects

In the camera information sharing system 1 having the configuration described above, the digital camera 2 transmits an Exif file EXF of a taken picture to the information collecting server 5, and the information collecting server 5 acquires a picture-taking location name and an object location name corresponding to picture-taking location information PHi and object location information PX included in basic information BA of the Exif file EXF and registers the Exif file EXF, the picture-taking location name, and the object location name in association with each other.

Consequently, the digital camera 2 is capable of acquiring from the information collecting server 5 the picture-taking location name and the object location name associated with the picture without causing a user to perform a complicated operation, and presenting the picture-taking location name and the object location name as the picture-taking result screen G4 on the display unit 28.

Hence, the user is able to view and confirm a picture PT1 on the picture-taking result screen G4 and recognize that the picture-taking location name of the picture PT1 is "Izu" and the object location name of the target of picture-taking is "Mt. Fuji".

That is, the camera information sharing system 1 according to an embodiment of the present invention is capable of presenting a picture-taking location name and an object location name, which are clearly distinguished from each other, to a user. Thus, the camera information sharing system 1 is capable of guiding the user to taking a picture of a target of picture-taking located at the location represented by the object location name, with the same composition as that of the picture PT1, when the user takes the picture at the location represented by the picture-taking location name.

In addition, in the camera information sharing system 1 according to an embodiment of the present invention, even if basic information BA of an Exif file EXF does not include picture-taking location information PHi and object location information PX and thus the information collecting server 5 is not capable of acquiring a picture-taking location name and an object location name, a plurality of candidates can be presented in accordance with past records of picture-taking location names and object location names that have been uploaded and registered.

Consequently, only by allowing a user to select a picture-taking location name and an object location name that are most appropriate from among the candidates, the digital camera 2 is capable of transmitting the picture-taking location name and the object location name, which are selection results, to the information collecting server 5, and the Exif file EXF, the picture-taking location name, and the object location name can be registered in the information collecting server 5 in association with each other.

With the configuration described above, in the camera information sharing system 1, both a picture-taking location name and an object location name of a picture taken by the digital camera 2 can be automatically searched for, and an Exif file EXF, the picture-taking location name, and the object location name of the picture can be registered in association with each other. Thus, the camera information sharing system 1 is capable of providing information on the picture-taking location name and the object location name without causing a user of the digital camera 2 to perform a complicated operation.

(11) Other Embodiments

In the embodiment described above, a case where the control unit 20 of the digital camera 2 transmits to the information collecting server 5 location information P (picture-taking location information PHi and object location information PX) of a still image captured by the image pickup unit 27 has been described.

However, the present invention is not limited to this. The control unit 20 of the digital camera 2 may transmit to the information collecting server 5 location information P (picture-taking location information PHi and object location information PX) of a moving image captured by the image pickup unit 27.

In addition, in the embodiment described above, a case where the information collecting server 5 acquires, via the location name server 6, the name of a landmark, such as "Izu", "Numazu", "Mt. Fuji", "Lake Yamanaka", or "Lake Kawaguchi", as a picture-taking location name or an object location name has been described.

However, the present invention is not limited to this. The information collecting server 5 may also search for more detailed information, such as address and telephone number, and acquire such information in accordance with data registered in the location name database 56 of the location name server 6.

Furthermore, in the embodiment described above, a case where the information collecting server 5 searches for a picture-taking location travelling route and an object location travelling route and transmits the found routes to the digital camera 2 has been described.

However, the present invention is not limited to this. The digital camera 2 may contain a navigation processor so that the digital camera 2 can search for a picture-taking location travelling route and an object location travelling route.

Furthermore, in the embodiment described above, a case where only a picture-taking location name corresponding to picture-taking location information PHi and only an object location name corresponding to object location information PX are registered in the location name database 56 of the location name server 6 has been described.

However the present invention is not limited to this. In a case where a plurality of picture-taking location names corresponding to picture-taking location information PHi and a plurality of object location names corresponding to object location information PX exist in different layers, the information collecting server 5 may cause the digital camera 2 to present a plurality of candidates so that a user can directly select one of the picture-taking location names and one of the object location names.

For example, in a case where candidates, such as "Fujiyoshida City" and "Fifth station of Mt. Fuji" as well as "Mt. Fuji" are registered as object location names corresponding to a piece of object location information PX in the location name database 56 of the location name server 6, by allowing a user to select one of the three candidates, an object location name that reflects the user's intention can be registered. The same applies to a picture-taking location name.

Furthermore, in the embodiment described above, a case where, for an Exif file EXF of a picture not including location information P (picture-taking location information PHi and object location information PX), picture-taking location names and object location names that appear at high frequency are extracted as candidates from previously registered location names has been described.

However, the present invention is not limited to this. A picture-taking location name and an object location name that have been registered in association with another Exif file EXF on a close date may be used as candidates. Alternatively, a picture-taking location name and an object location name that have been registered in association with another Exif file EXF of the same user may be used as candidates.

Moreover, in a case where the similarity between picture data FD of an Exif file EXF not including location information P and picture data FD of an Exif file EXF that has been registered in association with a picture-taking location name and an object location name is determined in accordance with the degree of correlation between images and the similarity is higher than a predetermined threshold, the picture-taking location name and the object name may be used as candidates.

Furthermore, in the embodiment described above, a case where the information collecting server 5 transmits picture-taking location information PHi and object location information PX to the location name server 6 and acquires a picture-taking location name and an object location name corresponding to the picture-taking location information PHi and the object location information PX from the location name server 6 has been described.

However, the present invention is not limited to this. The information collecting server 5 and the location name server 6 may be integrated with each other so that a picture-taking location name and an object location name corresponding to picture-taking location information PHi and object location information PX can be acquired inside the information collecting server 5 and the location name server 6.

Furthermore, in the embodiment described above, a case where the above-described automatic location name registration process, location name candidate presentation process, picture evaluation process, identical picture-taking environment guidance process, and the like are performed in accordance with an application program installed in advance has been described.

However, the present invention is not limited to this. The above-described automatic location name registration process, location name candidate presentation process, picture evaluation process, identical picture-taking environment guidance process, and the like may be performed in accordance with an application program installed from a predetermined recording medium, an application program downloaded from the Internet, or an application program installed via various other routes.

Furthermore, in the embodiment described above, a case where the information collecting server 5 serving as a location name registration apparatus according to an embodiment of the present invention includes the network interface 44 serving as a reception unit and the CPU 40 serving as a location name acquisition unit and a location name registration unit has been described. However, the present invention is not limited to this. A location name registration apparatus according to an embodiment of the present invention may include a reception unit, a location name acquisition unit, and a location name registration unit having various other configurations.

The present application contains subject matter related to that disclosed in Japanese Priority Patent Application JP 2008-221712 filed in the Japan Patent Office on Aug. 29, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A location name registration apparatus comprising:
   reception means for receiving, from a picture-taking apparatus, a plurality of picture data, each picture data including an image of an object taken by the picture-taking apparatus, some of the plurality of picture data including picture-taking location information corresponding to a latitude and longitude of a picture-taking location acquired when the some of the plurality of picture data were taken, the some of the plurality of picture data including object location information corresponding to a latitude and longitude of the object, and at least one of the plurality of picture data not including picture-taking location information and object location information;
   location name acquisition means for acquiring, from a location name storage unit, a picture-taking location name of the picture-taking location for each of the some of the plurality of picture data in accordance with the picture-taking location information, and acquiring, from the location name storage unit, an object location name of the object location for each of the some of the plurality of picture data in accordance with the object location information;
   a processor that generates a graphical user interface that includes a list of candidate picture-taking location names and object location names for the at least one of the plurality of picture data not including the picture-taking location information and not including the object location information, said list of candidates being taken only from the picture-taking location names and object location names for the some of the plurality of picture data,
   wherein the processor receives an instruction that identifies, from the list of candidates, the picture-taking location name and the object location name for the at least one of the plurality of picture data not including the picture-taking location information and not including the object location information; and
   location name registration means for registering, for each of the plurality of picture data, the picture-taking location name, the object location name, and the picture data in association with each other in predetermined storage unit.

2. The location name registration apparatus according to claim 1,
   wherein the reception means receives, from the picture-taking apparatus, camera information for each of the some of the plurality of picture data, said camera information including a direction from the picture-taking location to the object, a picture-taking angle with respect to the object, shutter speed, and aperture, and
   wherein the location name registration means registers the camera information, as well as the picture-taking location name and the object location name, in association with the picture data, in the predetermined storage unit.

3. The location name registration apparatus according to claim 2, further comprising:
   transmission means for transmitting, to the picture-taking apparatus, the picture-taking location name or the object location name for one or more of the plurality of picture data registered in the predetermined storage unit by the location name registration means.

4. The location name registration apparatus according to claim 1, further comprising:
   transmission means for transmitting, to the picture-taking apparatus, the graphical user interface.

5. A location name registration method comprising the steps of:
   receiving, from a picture-taking apparatus, a plurality of picture data, each picture data including an image of an object taken by the picture-taking apparatus, some of the plurality of picture data including picture-taking location information corresponding to a latitude and longitude of a picture-taking location acquired when the some of the plurality of picture data were taken, the some of the plurality of picture data including object location information corresponding to a latitude and longitude of the object, and at least one of the plurality of picture data not including picture-taking location information and object location information;
   acquiring, from location name storage unit, a picture-taking location name of the picture-taking location for each of the some of the plurality of picture data in accordance with the picture-taking location information;
   acquiring, from the location name storage unit, an object location name of the object location for each of the some of the plurality of picture data in accordance with the object location information;
   generating a graphical user interface that includes a list of candidate picture-taking location names and object location names for the at least one of the plurality of picture data not including the picture-taking location information and not including the object location information, said list of candidates being taken only from the picture-taking location names and object location names for the some of the plurality of picture data;

receiving an instruction that identifies, from the list of candidates, the picture-taking location name and the object location name for the at least one of the plurality of picture data not including the picture-taking location information and not including the object location information; and registering, in a storage unit, for each of the plurality of picture data, the picture-taking location name, the object location name, and the picture data in association with each other.

6. A location name registration apparatus comprising:

a reception unit configured to receive, from a picture-taking apparatus, a plurality of picture data, each picture data including an image of an object taken by the picture-taking apparatus, some of the plurality of picture data including picture-taking location information corresponding to a latitude and longitude of a picture-taking location acquired when the some of the plurality of picture data were taken, the some of the plurality of picture data including object location information corresponding to a latitude and longitude of the object, and at least one of the plurality of picture data not including picture-taking location information and object location information;

a location name acquisition unit configured to acquire, from a location name storage unit, a picture-taking location name of the picture-taking location for each of the some of the plurality of picture data in accordance with the picture-taking location information and to acquire, from the location name storage unit, an object location name of the object location for each of the some of the plurality of picture data in accordance with the object location information;

a processor that generates a graphical user interface that includes a list of candidate picture-taking location names and object location names for the at least one of the plurality of picture data not including the picture-taking location information and not including the object location information, said list of candidates being taken only from the picture-taking location names and object location names for the some of the plurality of picture data, wherein the processor receives an instruction that identifies, from the list of candidates, the picture-taking location name and the object location name for the at least one of the plurality of picture data not including the picture-taking location information and not including the object location information; and a location name registration unit configured to register, for each of the plurality of picture data, the picture-taking location name, the object location name, and the picture data in association with each other in a predetermined storage unit.

7. The location name registration apparatus of claim 1, wherein the processor transmits another graphical user interface that includes the plurality of picture data, receives an instruction that identifies at least one of the plurality of picture data from the another graphical user interface, and generates a travel route from a current position to the picture taking location of the at least one of the plurality of picture data identified by the instruction.

8. The method of claim 5, further comprising:
transmitting another graphical user interface that includes the plurality of picture data;
receiving an instruction that identifies at least one of the plurality of picture data from the another graphical user interface; and
generating a travel route from a current position to the picture taking location of the at least one of the plurality of picture data identified by the instruction.

9. The location name registration apparatus of claim 6, wherein the processor transmits another graphical user interface that includes the plurality of picture data, receives an instruction that identifies at least one of the plurality of picture data from the another graphical user interface, and generates a travel route from a current position to the picture taking location of the at least one of the plurality of picture data identified by the instruction.

10. The location name registration apparatus of claim 1, wherein the processor receives an identification of a photographer name, the processor transmits another graphical user interface that includes picture data from the plurality of picture data that corresponds to the identified photographer name, receives an instruction that identifies at least one of the plurality of picture data from the another graphical user interface, and generates a travel route from a current position to the picture taking location of the at least one of the plurality of picture data identified by the instruction.

11. The method of claim 5, further comprising:
receiving an identification of a photographer name;
transmitting another graphical user interface that includes picture data from the plurality of picture data that corresponds to the identified photographer name;
receiving an instruction that identifies at least one of the plurality of picture data from the another graphical user interface; and
generating a travel route from a current position to the picture taking location of the at least one of the plurality of picture data identified by the instruction.

12. The location name registration apparatus of claim 6, wherein the processor receives an identification of a photographer name, the processor transmits another graphical user interface that includes picture data from the plurality of picture data that corresponds to the identified photographer name, receives an instruction that identifies at least one of the plurality of picture data from the another graphical user interface, and generates a travel route from a current position to the picture taking location of the at least one of the plurality of picture data identified by the instruction.

* * * * *